(12) United States Patent
Moyer

(10) Patent No.: US 10,871,384 B2
(45) Date of Patent: Dec. 22, 2020

(54) APPARATUS AND METHODS UTILIZING EMISSIVE PATTERNS TO DETERMINE POSITIONAL INFORMATION

(71) Applicant: Thomas P. Moyer, Lagrangeville, NY (US)

(72) Inventor: Thomas P. Moyer, Lagrangeville, NY (US)

(*) Notice: Subject to any disclaimer, the term of this patent is extended or adjusted under 35 U.S.C. 154(b) by 0 days.

(21) Appl. No.: 16/285,868

(22) Filed: Feb. 26, 2019

(65) Prior Publication Data

US 2020/0271482 A1 Aug. 27, 2020

(51) Int. Cl.
  *G06F 3/147* (2006.01)
  *G01D 5/26* (2006.01)

(52) U.S. Cl.
  CPC .............. *G01D 5/262* (2013.01); *G06F 3/147* (2013.01)

(58) Field of Classification Search
  CPC ..... G03D 5/262; G06F 3/147; G06F 3/30304; G01D 5/262
  USPC .......................................................... 356/616
  See application file for complete search history.

(56) References Cited

U.S. PATENT DOCUMENTS

| | | |
|---|---|---|
| 3,922,654 A | 11/1975 | Hobson, Jr. |
| 4,054,385 A | 10/1977 | Wheable |
| 4,238,828 A | 12/1980 | Hay et al. |
| 4,275,596 A | 6/1981 | Horn |
| 4,281,342 A | 7/1981 | Ueda et al. |
| 4,321,830 A | 3/1982 | Horn |
| 4,325,256 A | 4/1982 | Horn |
| 4,338,518 A | 7/1982 | Brienza et al. |
| 4,395,124 A | 7/1983 | Remijan |
| 4,584,471 A | 4/1986 | Gabriel |
| 4,668,862 A | 5/1987 | Waibel |
| 4,670,649 A | 6/1987 | Senior et al. |
| 4,731,744 A | 3/1988 | Harrell, Jr. et al. |
| 4,772,835 A | 9/1988 | Weaver et al. |
| 4,785,180 A | 11/1988 | Dietrich et al. |
| 4,947,247 A | 8/1990 | Farver |
| 5,181,079 A | 1/1993 | Klinger |
| 5,590,059 A | 12/1996 | Schier |
| 5,784,168 A | 7/1998 | Ophey et al. |
| 6,326,908 B1 | 12/2001 | Hoffman et al. |
| 6,532,681 B2 | 3/2003 | Tondorf |

(Continued)

*Primary Examiner* — Hung Nguyen
(74) *Attorney, Agent, or Firm* — Law Offices of Michael L. Wise, LLC

(57) ABSTRACT

Absolute, non-juxtaposed position encoders (i.e., position-determining systems) for up to six degrees-of-freedom are described. Each of these apparatus includes a display, an observation device, display circuitry, and logic circuitry. The display includes a plurality of pixels. In addition, the observation device is capable of observing light emitted from a region of the display. The display circuitry is able to cause one or more emissive patterns to be displayed on the display. The logic circuitry is able to determine a position of the observation device relative to the display at least in part from the light observed by the observation device. The observation device is capable of being moved in relation to the display, or vice versa. Aspects of the invention are suitable for use in a diverse set of applications such as: autonomously-piloted vehicles, multi-axis robotic arms, three-dimensional (3D) printers, computer-numerical-control (CNC) machine tools, and cranes.

20 Claims, 15 Drawing Sheets

(56) References Cited

U.S. PATENT DOCUMENTS

| | | |
|---|---|---|
| 6,552,809 B1 | 4/2003 | Bergeron et al. |
| 6,603,115 B1 | 8/2003 | Gordon-Ingram |
| 6,660,997 B2 | 12/2003 | Laberge et al. |
| 6,678,059 B2 | 1/2004 | Cho et al. |
| 6,765,195 B1 | 7/2004 | Leviton |
| 6,781,694 B2 | 8/2004 | Nahum et al. |
| 8,064,686 B2 | 11/2011 | Wagner et al. |
| 8,451,535 B2 * | 5/2013 | Nam .................... H04N 13/305 359/458 |
| 8,531,650 B2 | 9/2013 | Feldkhun et al. |
| 8,537,377 B2 | 9/2013 | Burkland |
| 8,836,921 B2 | 9/2014 | Feldkhun et al. |
| 8,875,409 B2 | 11/2014 | Kretschmer et al. |
| 9,035,859 B2 * | 5/2015 | Yamazaki ........... G02F 1/13471 345/87 |
| 9,342,889 B2 | 5/2016 | Cho |
| 9,354,042 B2 | 5/2016 | Tsujii et al. |
| 9,797,706 B2 | 10/2017 | Jordil et al. |
| 9,874,434 B2 | 1/2018 | Holzapfel |
| 2005/0190162 A1 * | 9/2005 | Newton .................. G06F 3/042 345/175 |
| 2013/0100075 A1 * | 4/2013 | Viswanathan ........ G06F 3/0416 345/175 |
| 2014/0028553 A1 * | 1/2014 | Harland ................ G06F 3/0304 345/158 |
| 2014/0057565 A1 * | 2/2014 | Kim ...................... G06F 3/1454 455/41.2 |
| 2016/0291693 A1 * | 10/2016 | Tang .................. G02B 27/0172 |
| 2016/0300518 A1 * | 10/2016 | Wei ........................ G09G 3/006 |

* cited by examiner

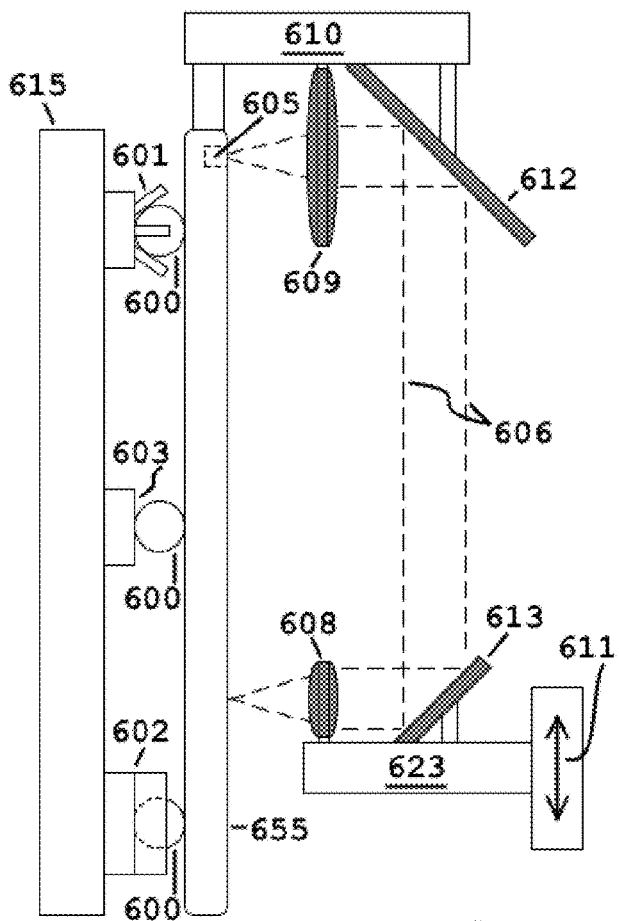
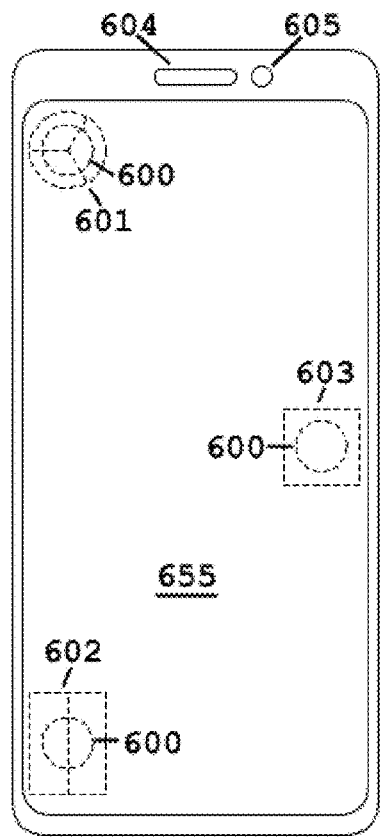
FIG. 6a    FIG. 6b
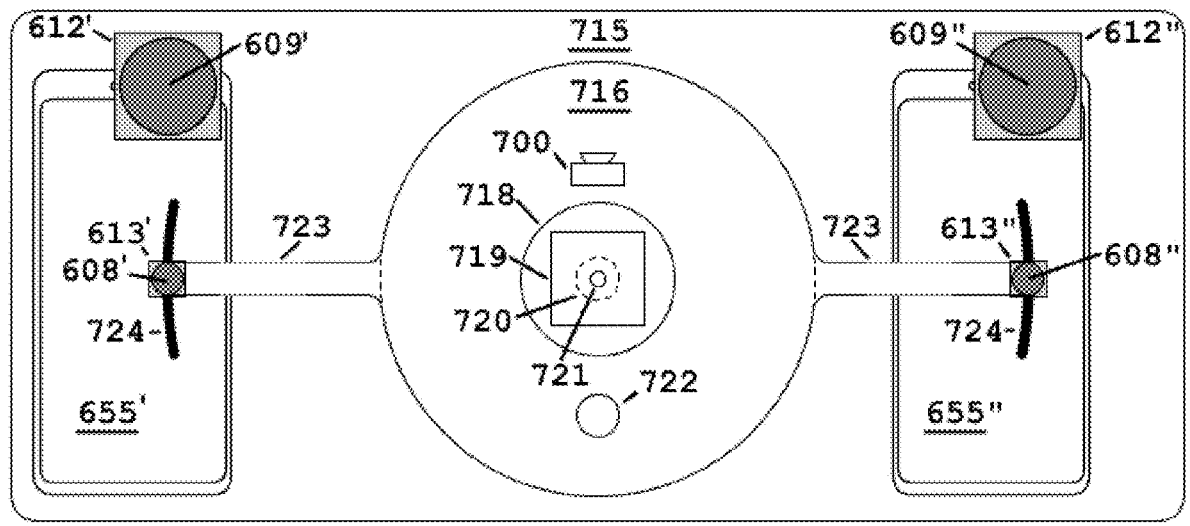
FIG. 7

| pixels per unit cell | index |
|---|---|
| 1x1 | 801 |
| 1x2 | 802 |
| 2x2 | 803 |
| 2x4 | 804 |
| 4x4 | 805 |
| 4x8 | 806 |
| 8x8 | |
| 8x16 | |
| 16x16 | |
| 16x32 | |
| 32x32 | |
| 32x64 | |
| 64x64 | |
| 64x128 | |
| 128x128 | |
| 128x256 | |
| 256x256 | |
| 256x512 | |
| 512x512 | |
| 512x1024 | |
| 1024x1024 | |
| 1024x2048 | |
| 2048x2048 | |
| 2048x4096 | |
| 4096x4096 | |
FIG. 8a
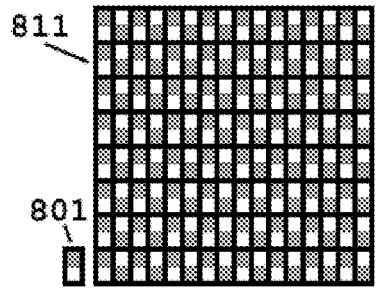
FIG. 8b
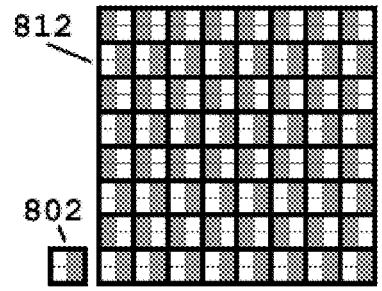
FIG. 8c
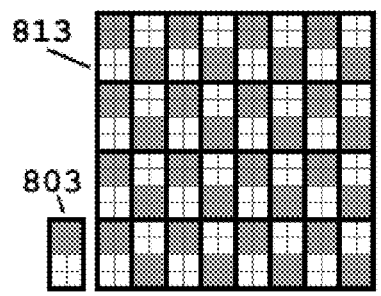
FIG. 8d
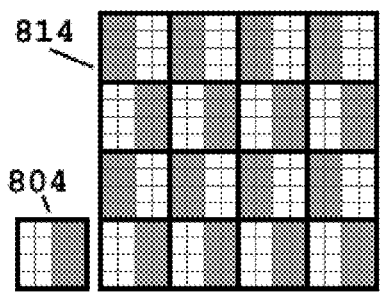
FIG. 8e
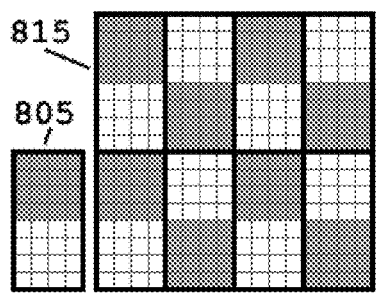
FIG. 8f
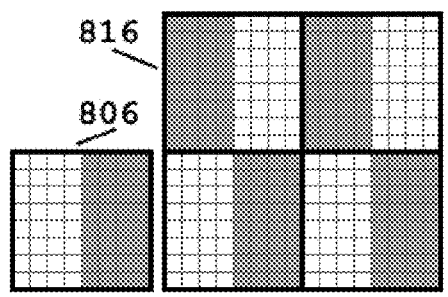
FIG. 8g

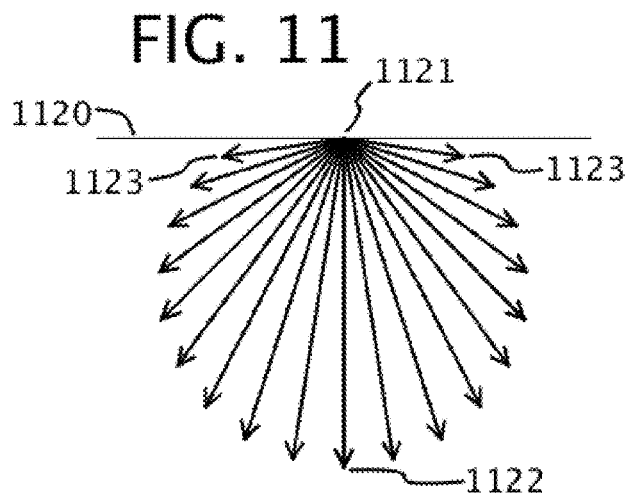

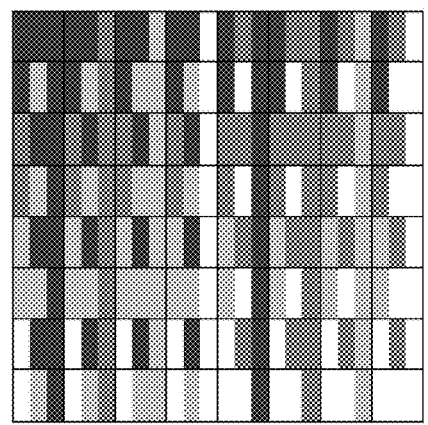
FIG. 12a
FIG. 12b
FIG. 12c
FIG. 12d
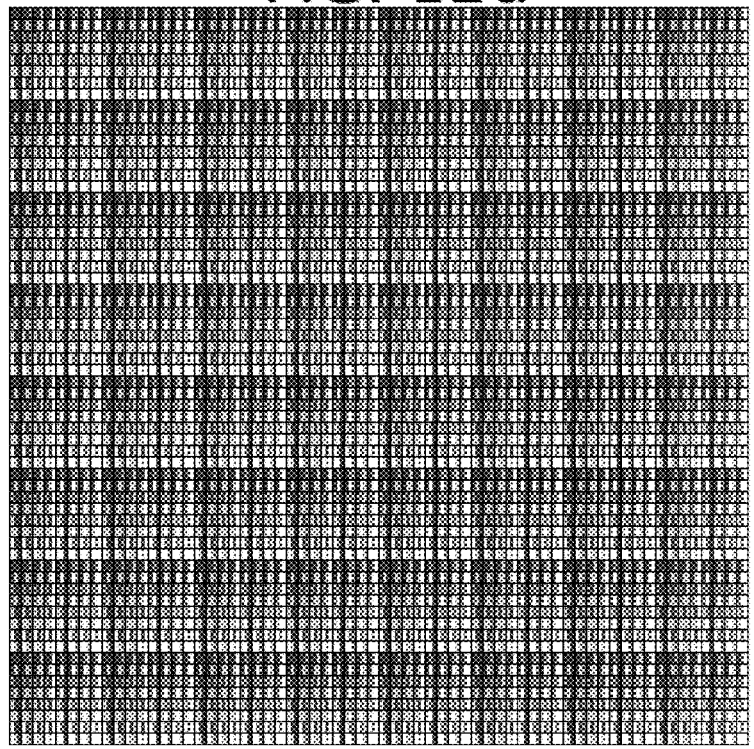

| 1311 | 591840 | 591839 | 591838 |
| --- | --- | --- | --- |
| 1312 | 0 | 0 | 0 |
| 1311 | 591292 | 591291 | 591290 |
| 1312 | 0 | 0 | 0 |
| 1311 | 590744 | 590743 | 590742 |
| 1312 | 0 | 0 | 0 |
| 1311 | 590196 | 590195 | 590194 |
FIG. 13a
FIG. 13b
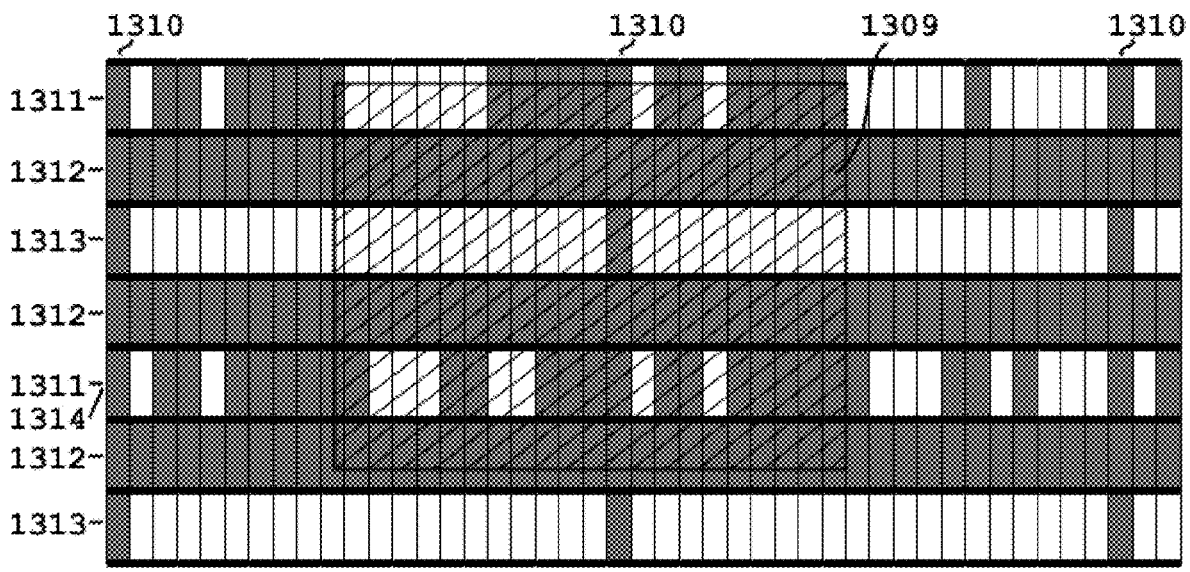
FIG. 13c
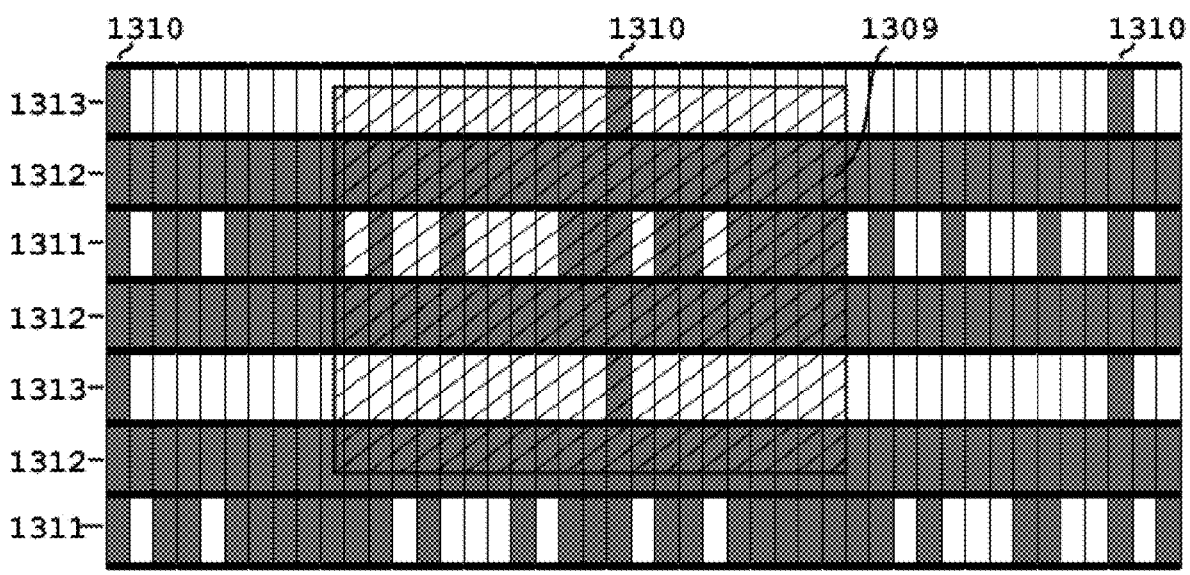
FIG. 13d

| 1411— | 1913760 | 1913759 | 1913758 | 1913757 |
| --- | --- | --- | --- | --- |
| 1411— | 1912874 | 1912873 | 1912872 | 1912871 |
| 1411— | 1911988 | 1911987 | 1911986 | 1911985 |
| 1411— | 1911102 | 1911101 | 1911100 | 1911099 |
| 1411— | 1910216 | 1910215 | 1910214 | 1910213 |
| 1411— | 1909330 | 1909329 | 1909328 | 1909327 |
| 1411— | 1908444 | 1908443 | 1908442 | 1908441 |
FIG. 14a
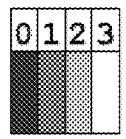
FIG. 14b
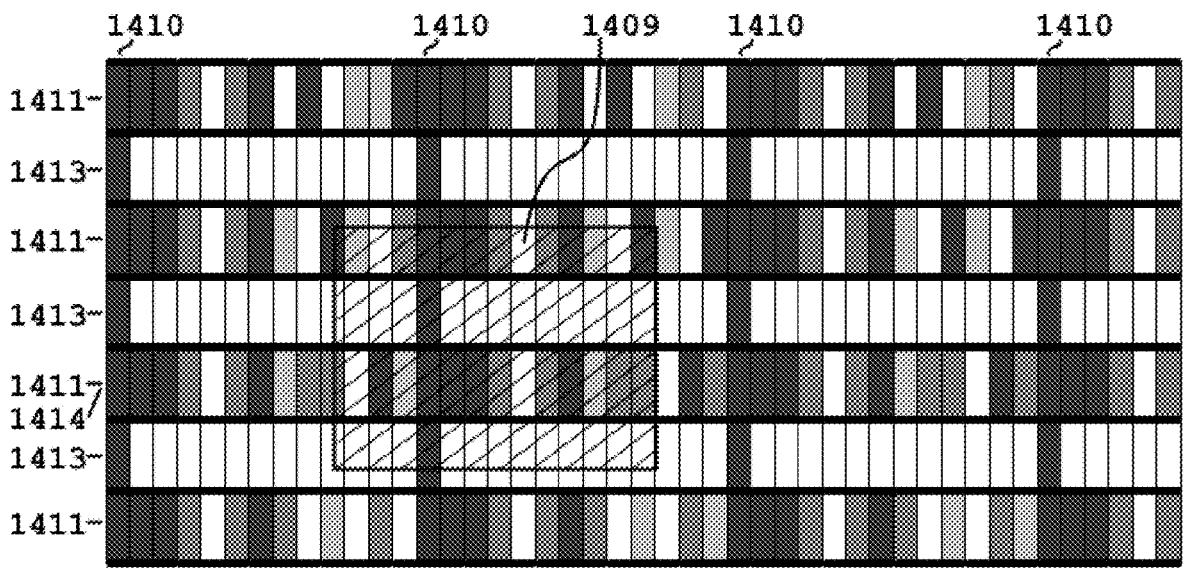
FIG. 14c
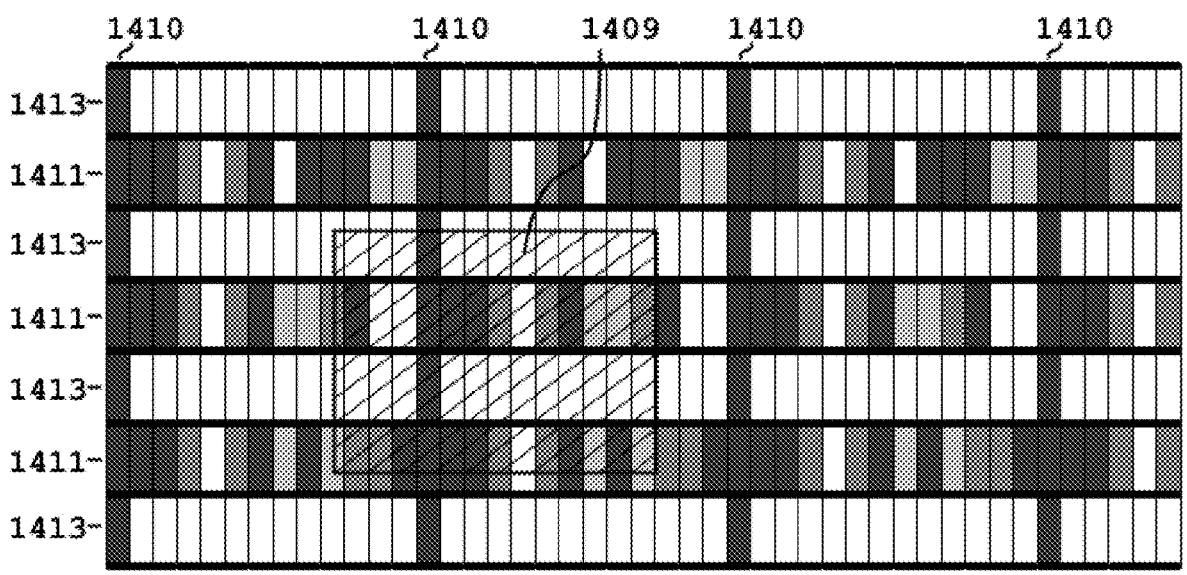
FIG. 14d

FIG. 15a

| quantity | entity |
|---:|---|
| 1,640 | Raspberry Pi V2 Camera X pixel count |
| 1,232 | Raspberry Pi V2 Camera Y pixel count |
| 62.2 | Raspberry Pi V2 Camera horizontal field-of-view (degrees) |
| 3,840 | UHD TV X pixel count |
| 2,160 | UHD TV Y pixel count |
| 8,294,400 | UHD TV total pixel count |
| 3 | color bar emitters per pixel |
| 11,520 | UHD TV color bar emitters per row |
| 24,883,200 | UHD TV color bar emitters |

FIG. 15b

| inch | millimeter | description |
|---:|---:|---|
| 0.0001 | 0.00254 | "tenth" imperial metalworking tool incremental unit |
| 0.001 | 0.0254 | "1 mil" metalworking dimension unit |
| 0.005 | 0.127 | "5 mills" nominal metalworking tolerance |
| 0.0313 | 0.795 | "1/32" woodworking tollerance |
|  | 0.2452 | measured width of pixel on a 43" class UHD TV |
|  | 0.2452 | measured height of pixel on a 43" class UHD TV |

FIG. 15c

| minimum field of view width mm | number color bars per ID | quantity ID's | ID'able row period | quantity brightness levels | camera pixels per 0.0025 mm (~0.0001") | camera pixels per 0.025 mm (~0.001") | camera pixels per color bar width | camera pixels per 0.1 mm (~0.004") | camera pixels per 1/32 inch (~0.8 mm) |
|---:|---:|---:|---:|---:|---:|---:|---:|---:|---:|
| 0.286 | 3 | 8,294,400 | 1 | 203 | 14.3 | 143.3 | 458.6 | 573.3 |  |
| 0.450 | 5 | 4,976,640 | 1 | 49 | 9.1 | 91.2 | 291.9 | 364.8 |  |
| 0.531 | 6 | 4,147,200 | 1 | 23 | 7.7 | 77.2 | 247.0 | 308.7 |  |
| 0.613 | 7 | 3,553,200 | 1 | 14 | 6.7 | 66.9 | 214.0 | 267.5 |  |
| 0.695 | 8 | 3,110,400 | 1 | 10 | 5.9 | 59.0 | 188.8 | 236.1 |  |
| 0.776 | 9 | 2,764,800 | 1 | 8 | 5.3 | 52.8 | 169.0 | 211.2 |  |
| 0.858 | 10 | 2,488,320 | 1 | 7 | 4.8 | 47.8 | 152.9 | 191.1 | 1,528.8 |
| 0.940 | 11 | 2,261,520 | 1 | 6 | 4.4 | 43.6 | 139.6 | 174.5 | 1,395.8 |
| 1.022 | 12 | 2,073,600 | 1 | 5 | 4.0 | 40.1 | 128.4 | 160.5 | 1,284.2 |
| 1.103 | 13 | 1,913,760 | 1 | 4 | 3.7 | 37.2 | 118.9 | 148.6 | 1,189.1 |
| 1.185 | 14 | 887,760 | 2 | 3 | 3.5 | 34.6 | 110.7 | 138.4 | 1,107.0 |
| 1.267 | 15 | 829,440 | 2 | 3 | 3.2 | 32.4 | 103.6 | 129.5 | 1,035.6 |
| 1.349 | 16 | 777,600 | 2 | 3 | 3.0 | 30.4 | 97.3 | 121.6 | 972.9 |
| 1.430 | 17 | 731,160 | 2 | 3 |  | 28.7 | 91.7 | 114.7 | 917.3 |
| 1.512 | 18 | 691,200 | 2 | 3 |  | 27.1 | 86.8 | 108.5 | 867.7 |
| 1.594 | 19 | 654,480 | 2 | 3 |  | 25.7 | 82.3 | 102.9 | 823.2 |
| 1.676 | 20 | 622,080 | 2 | 3 |  | 24.5 | 78.3 | 97.9 | 783.0 |
| 1.757 | 21 | 591,840 | 2 | 2 |  | 23.3 | 74.7 | 93.3 | 746.6 |
| 2.733 | 21 | 591,840 | 2 | 2 |  | 15.0 | 48.0 | 60.0 | 480.0 |
| 8.200 | 21 | 591,840 | 2 | 2 |  | 5.0 | 16.0 | 20.0 | 160.0 |
| 14.240 | 21 | 591,840 | 2 | 2 |  | 3.0 | 30.0 | 12.0 | 96.0 |
| 27.333 | 21 | 591,840 | 2 | 2 |  |  | 5.0 | 2.0 | 16.0 |
| 44.681 | 21 | 591,840 | 2 | 2 |  |  | 3.0 | 1.2 | 9.6 |

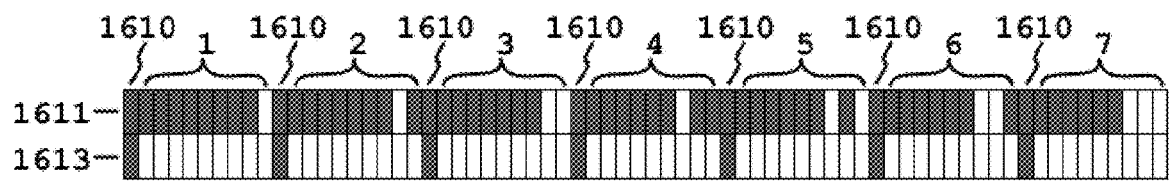
FIG. 16a
FIG. 16b
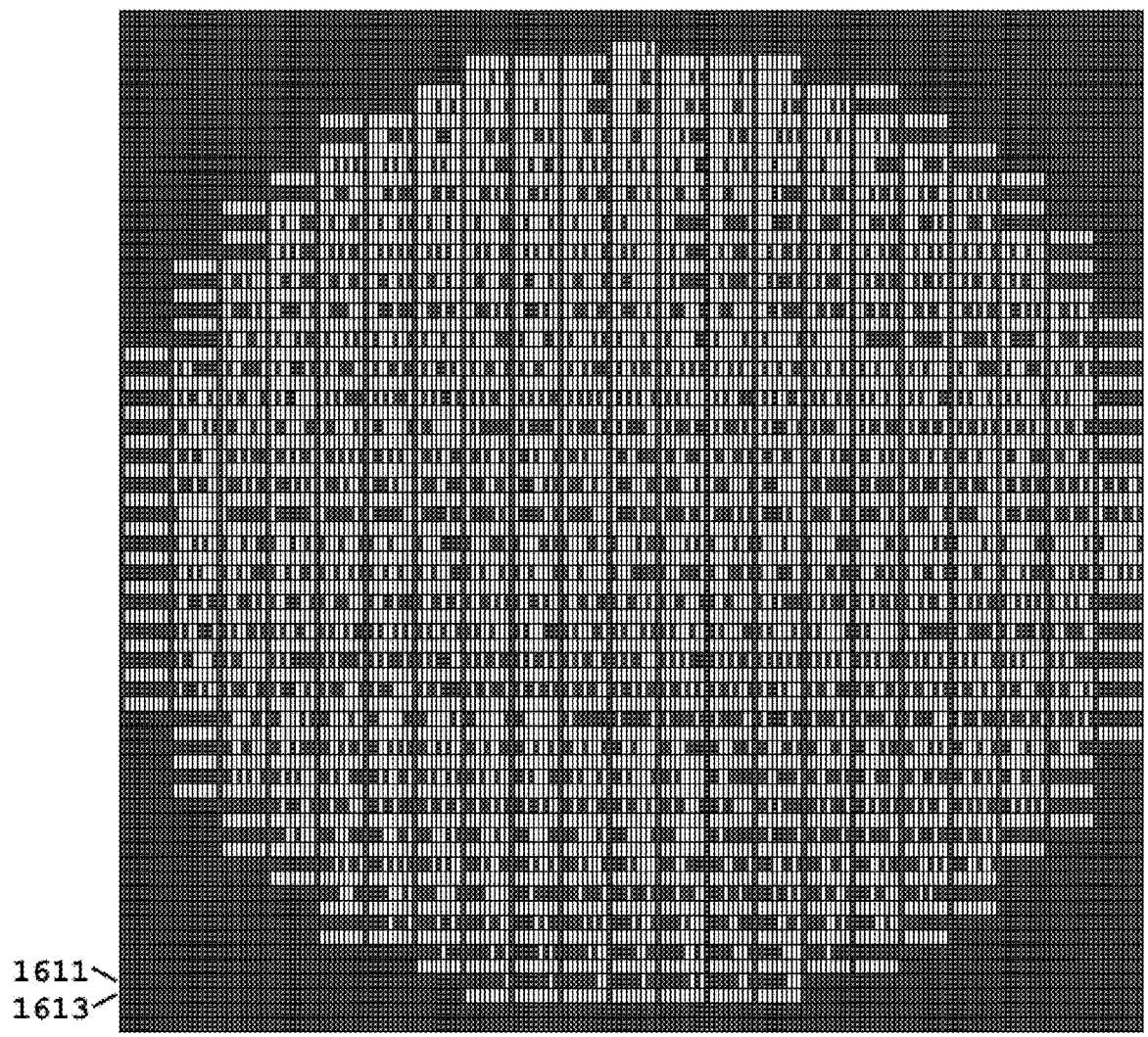
FIG. 16c

FIG. 17a

| millimeter | description |
|---|---|
| 0.2452 | measured width of pixel on a 43" class UHD TV |
| 0.2452 | measured height of pixel on a 43" class UHD TV |
| 26.240 | maximum width of Field Of View to have 10 camera pixels across a color bar width |

FIG. 17b number brightness levels=2

| Min Field Of View | number color bars per ID | quantity ID's | radius covered mm |
|---|---|---|---|
| 0.123 | 3 | 8 | |
| 0.225 | 5 | 16 | |
| 0.266 | 6 | 32 | |
| 0.307 | 7 | 64 | 0.92 |
| 0.347 | 8 | 128 | 1.47 |
| 0.388 | 9 | 256 | 2.36 |
| 0.429 | 10 | 512 | 3.64 |
| 0.470 | 11 | 1,024 | 5.55 |
| 0.511 | 12 | 2,048 | 8.35 |
| 0.552 | 13 | 4,096 | 12.49 |
| 0.593 | 14 | 8,192 | 18.48 |
| 0.633 | 15 | 16,384 | 27.37 |
| 0.674 | 16 | 32,768 | |
| 0.715 | 17 | 65,536 | |
| 0.756 | 18 | 131,072 | |
| 0.797 | 19 | 262,144 | |
| 0.838 | 20 | 524,288 | |
| 0.879 | 21 | 1,048,576 | |

FIG. 17c number brightness levels=3

| Min Field Of View | number color bars per ID | quantity ID's | radius covered mm |
|---|---|---|---|
| 0.123 | 3 | 27 | |
| 0.225 | 5 | 81 | |
| 0.266 | 6 | 243 | |
| 0.307 | 7 | 729 | 3.76 |
| 0.347 | 8 | 2,187 | 7.12 |
| 0.388 | 9 | 6,561 | 13.36 |
| 0.429 | 10 | 19,683 | 24.64 |
| 0.470 | 11 | 59,049 | |
| 0.511 | 12 | 177,147 | |
| 0.552 | 13 | 531,441 | |
| 0.593 | 14 | 1,594,323 | |

FIG. 17d number brightness levels=4

| Min Field Of View | number color bars per ID | quantity ID's | radius covered mm |
|---|---|---|---|
| 0.123 | 3 | 64 | |
| 0.225 | 5 | 256 | 1.80 |
| 0.266 | 6 | 1,024 | 4.18 |
| 0.307 | 7 | 4,096 | 9.27 |
| 0.347 | 8 | 16,384 | 20.10 |
| 0.388 | 9 | 65,536 | |
| 0.429 | 10 | 262,144 | |
| 0.470 | 11 | 1,048,576 | |

APPARATUS AND METHODS UTILIZING EMISSIVE PATTERNS TO DETERMINE POSITIONAL INFORMATION

FIELD OF THE INVENTION

The present invention relates generally to apparatus and methods for determining positional information, and, more particularly, to apparatus and methods that use emissive patterns to determine the positions of movable objects.

BACKGROUND OF THE INVENTION

The gathering of positional information is important to diverse families of machines, which have a wide range of commercial functions. Computer numerical control (CNC) machines remove material to create useful shapes in metal, wood, and plastics. Material is also removed by electrical discharge machining (EDM), plasma cutting, and water jet cutting tools. Alternatively, material modification can also be additive, as in three-dimensional (3D) printing, painting, and welding. Robotic multistage articulated arms employ all of the aforementioned end effectors as well as frequently having pick-and-place grippers. Cranes lift loads and place them at desired locations, often with the position determination requiring visual input from skilled operators. For all of these systems, the nature of the position determining subsystem is an important part of the tradeoffs made between accuracy, cost, and speed of operation.

In a conventional 3D CNC machine, the end effector is supported for movement along three mutually perpendicular axes (i.e., in directions x, y and z). As a result, the end effector can be guided to any arbitrary point in space throughout the machine addressable volume. A suitable position encoder is mounted on each axis and is able to determine the position of the axis next closer to the end effector, relative to the base of the first said axis. Machines with higher resolution requirements will often afford the more expensive linear encoders. The more expensive encoder technology allows the position measurement to be made closer to the end effector and avoid the inaccuracies which result from mechanical variabilities in the drive mechanism. The lower cost alternative in the current art is to use rotary encoders on the motors. The rotary encoder systems move the measurement further from the end effector by including the drive mechanism in the chain of mechanical interconnections between the measurement point and the end effector. Backlash in the drive mechanism, and deviations from expected thread-to-thread locations in screw-type drives and tooth-to-tooth positions in rack-and-pinion systems are unaccountable positional errors in the rotary encoder systems. In both types of encoder systems, deflection of the axes, play in the connections between axes, and thermal expansion around uncontrolled locations also exist as unaccountable positional errors.

The multistage articulated arm construction commonly found in industrial robotic systems needing positional information have their axis-to-axis movement as angular, rather than the linear displacement of conventional 3D machines. The rotary encoders at these arm joints are blind to play orthogonal to the direction of the arm motion. Deflection in the arm sections is also unmeasurable by the angular encoders at the joints. The positional errors caused thereby are linearly exaggerated along the length of the arm to give correspondingly larger unmeasurable errors at the end effector location.

Another category of 3D machines is characterized by extensible/contractible connecting-members between the fixed portions of the machine and the moving 3D end effector. The unidirectional support cable of classical overhead cranes is among the simplest mechanical embodiments of this machine category. An example of intermediate complexity is the multi-cable reeving of shipyard dockside container cranes. Even more mechanically complex versions of this machine category are presently those based on Stewart Platforms, parallel manipulators, and their derivative systems, including the so called "Robocrane" and "Delta Robot" systems. The standard form of linear encoder has a rigid housing for a scale with a length at least as long as the maximal measured length. Nevertheless, the absence of any such member spanning the fixed-to-movable machine portions precludes the use of such linear encoders. Rotary encoders are able to be employed on systems where the connecting members are flexible tensile constructs such as wire rope. In these systems, encoders are used to measure the angular motion of the sheaves around which the wire ropes are wrapped. This combination suffers from having the long elastic length of the wire rope between the measuring location and the end effector. The wire rope will not only stretch and contract in an oscillatory manner after the load experiences applied forces, but it is also subject to forces such as wind which act upon the wire rope itself.

Many of these systems employ the lamentably less than ten-centimeter baseline binocular optics of a human operator. Such operators have historically had high maintenance requirements, frequent downtimes, and long lead times before achieving the required skill levels. Another position measurement solution is to combine distance measurement through interferometric or time-of-flight techniques with dual rotary encoders orthogonal to the distance direction. Even another solution is to use photogrammetry. Nevertheless, these solutions, too, are frequently unsatisfying.

In non-juxtaposed position determinations, depth information can be derived from light, radio, or sound beams by two techniques. Both the interferometric and time-of-flight techniques require precision movements in the directions orthogonal to the depth measurement in order to keep the radiation source directed at the desired localized sub-portion of the end-effector. These movements can be converted to the second and third of the end effector 3D position coordinates when appropriate rotational encoders are incorporated in the radiation source azimuth and inclination movement mechanics. However, the positional uncertainty in these encoders is degraded to greater uncertainty in the end effector position by the ratio of the measured distance to the radius of the encoder.

Commercially viable interferometric distance measurements for distances larger than a few centimeters are usually implemented using a three-corner reflector, often enclosed in a spherical housing referred to as a ball reflector. The ball reflector needs to be moved from the coherent light source to the target so that the count of interference nodes can be made. An interference node occurs identically for a distance increase or for a distance decrease, so the reflector ball transport must never reverse direction on its travel from source to target. For light-based interferometric systems, this travel unidirectionality needs to be at the sub-micron scale. Compliance with the unidirectional travel requirement can be met when calibration jigging is able to provide a rigid pathway over which the reflector can be transported but is difficult to achieve in the everyday work condition of an airgap between the light source and the measured tool end effector. This difficulty is further exacerbated in machines in which the working distance over which position determination is desired extends beyond a few meters. A compounding difficulty is that the reflector source to end effector transport needs to occur after every light source power-on cycle, and after every intermittent beam occluding incident such as an operator or a bird moving in front of the beam. These startup and maintenance difficulties for this inherently incremental-only technique, have caused commercial energy beam-based distance measurements to accept lower resolution by implementing depth measurements based on time-of-flight for most non-calibration, day-to-day position measurement operations.

Systems based on other phenomena each have unique detriments which are correlated with their not having found widespread commercial application. Radio wave interferometry has a combination of undesirably long wavelength compared to light, and has additional health concerns about freely-emitted electromagnetic radiation. Moire interferometric systems suffer from the high expense and limited movement distances which arise from the precision positioning requirements for both the moire grids and the illuminating source.

Sound-based systems, of both the interferometric and time-of-flight distance measurement types suffer from imprecision due to changes in the propagation speed of sound due to air temperature and humidity effects. Auditory volume and ambient sound interference considerations also limit their effective range to a few dozen meters. The long wavelength of sound waves also contributes to limited resolution for these systems.

Light-based time-of-flight distance measurements are absolute and thus eliminate the reflector transport startup difficulties. This has allowed them to largely supplant the interferometric methods for day-to-day operations in non juxtaposed 3D measurement. Here too, however, they do express the same undesirable azimuth and inclination resolution limitations as the interferometric systems. In addition, the high speed of light imposes a unique and heavy cost burden on such systems. These systems require custom, operating temperature compensated, limited production volume, electronics and optical transducers to modulate the light beam to have an acceptably clean turn-on and turn-off, and to provide the single digit picosecond timing accuracy required for the reported +/−1 or 3 millimeter (mm) resolution of current systems. As such, cost is the primary detriment of such systems.

Attempts at photogrammetric solutions are described in, for example, U.S. Pat. Nos. 4,054,385; 4,238,828; 4,275,596; 4,321,830; 4,325,256; 6,603,115; 6,660,997; 6,678,059; 6,765,195; 6,781,694; 8,064,686; 9,342,889; and 9,797,706; which are not admitted as prior art by their citation herein. Nevertheless, each of these attempts suffers from one or more of the following disadvantages: (a) poor positional resolution; (b) limited ability to handle larger dimensions; (c) the need for prohibitively expensive equipment such as extremely high-resolution cameras; (d) high computational overhead resulting in slow response; and (e) being characterized by resolution that decreases as measured dimensions increase.

There is as a result a need for new apparatus and methods for determining positional information that address the above-described deficiencies.

SUMMARY OF THE INVENTION

Embodiments of the present invention address the above-identified needs by providing apparatus and methods that utilize emissive patterns to determine positional information. More particularly, embodiments describe non-juxtaposed, absolute position encoders (i.e., position-determining systems) for up to six degrees-of-freedom.

Aspects of the invention are directed to an apparatus comprising a display, an observation device, display circuitry, and logic circuitry. The display comprises a plurality of pixels. In addition, the observation device is capable of observing light emitted from a region of the display. The display circuitry is operative to cause one or more emissive patterns to be displayed on the display. The logic circuitry is operative to determine a position of the observation device relative to the display at least in part from the light observed by the observation device. The observation device is capable of being moved in relation to the display, or vice versa.

Additional aspects of the invention are directed to a method of determining a position of an object. One or more emissive patterns are caused to be displayed on the display. At the same time, an observation means is caused to observe light emitted from a region of the display. A position of the observation device is determined relative to the display at least in part from the light observed by the observation device. The observation device is capable of being moved in relation to the display, or vice versa.

Advantageously, embodiments in accordance with aspects of the invention may provide apparatus and methods that offer one or more of: (a) greater positional resolution at similar cost to conventional position encoding techniques, or even superior positional resolution at lower cost; (b) operationally acceptable determination speeds; (c) positional information at, or closer to, an end effector where conventional positional error typically increases; and (d) automation that eliminates error introduced by human operators. Applications for aspects of the invention include, as just a few non-limiting examples: autonomously piloted vehicles, multi-axis robotic arms, 3D printers, CNC machine tools, and cranes.

BRIEF DESCRIPTION OF THE DRAWINGS

These and other features, aspects, and advantages of the present invention will become better understood with regard to the following description, appended claims, and accompanying drawings where:

FIGS. 6a and 6b show diagrammatic representations of an illustrative apparatus that uses a cellular telephone as both a display and an observation device;

FIG. 7 shows a diagrammatic representation of an illustrative platform that allows an observation device to swivel;

FIGS. 8a-8g show aspects of an illustrative binary emissive pattern sequence;

FIGS. 10a-10c show aspects of an illustrative emissive pattern sequence using three binary colors;

FIG. 11 shows a diagrammatic representation of emissive anisotropy;

FIGS. 12a-12d show aspects of an illustrative emissive pattern sequence using four brightness levels on each of three colors;

FIGS. 13a-13d show aspects of an illustrative emissive pattern sequence for groups of 21 binary emissive elements;

FIGS. 14a-14d show aspects of an illustrative emissive pattern sequence for groups of 13 emissive elements with four brightness levels per element;

FIGS. 15a-15c show some calculations related to an illustrative embodiment for emissive multiple element groups;

FIGS. 16a-16c show aspects of an illustrative emissive pattern for a restrained quantity of emissive groups with ten binary emissive elements each; and FIGS. 17a-17d show some calculations related to restrained quantity multiple element groups.

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

The current invention uses one or more observation devices to mark distinguishable states of selected emissive entities as sequential control is expressed over a display such that after a fixed number of patterns have been expressed, the sequence of distinguishable states for every emissive element will have been unique. The identity of the emitters selected for observation is thereby known. Embodiments require the geometry of the observation devices to be known, and the positions of each of the emissive entities to be known relative to the other elements of the display, and the positional relationship between the observation devices and the display to be fixed for the duration of the sequential emissive patterns. Given these knowns, a minimally determinant set of calculations can fix the relative positions of the observation devices and the observed display in up to six degrees-of-freedom.

One type of embodiment imposes a single distinguishable state on proximal emissive elements for each of the successive patterns, with the extent of each single emissive state proximal region being reduced for each successive pattern. Distinguishable emissive states are created using one or more of brightness and color. The preferred embodiment of this type uses the maximum number of reliably discernable emissive states to minimize the number of patterns required to achieve emissive element identification.

Figure 1B:
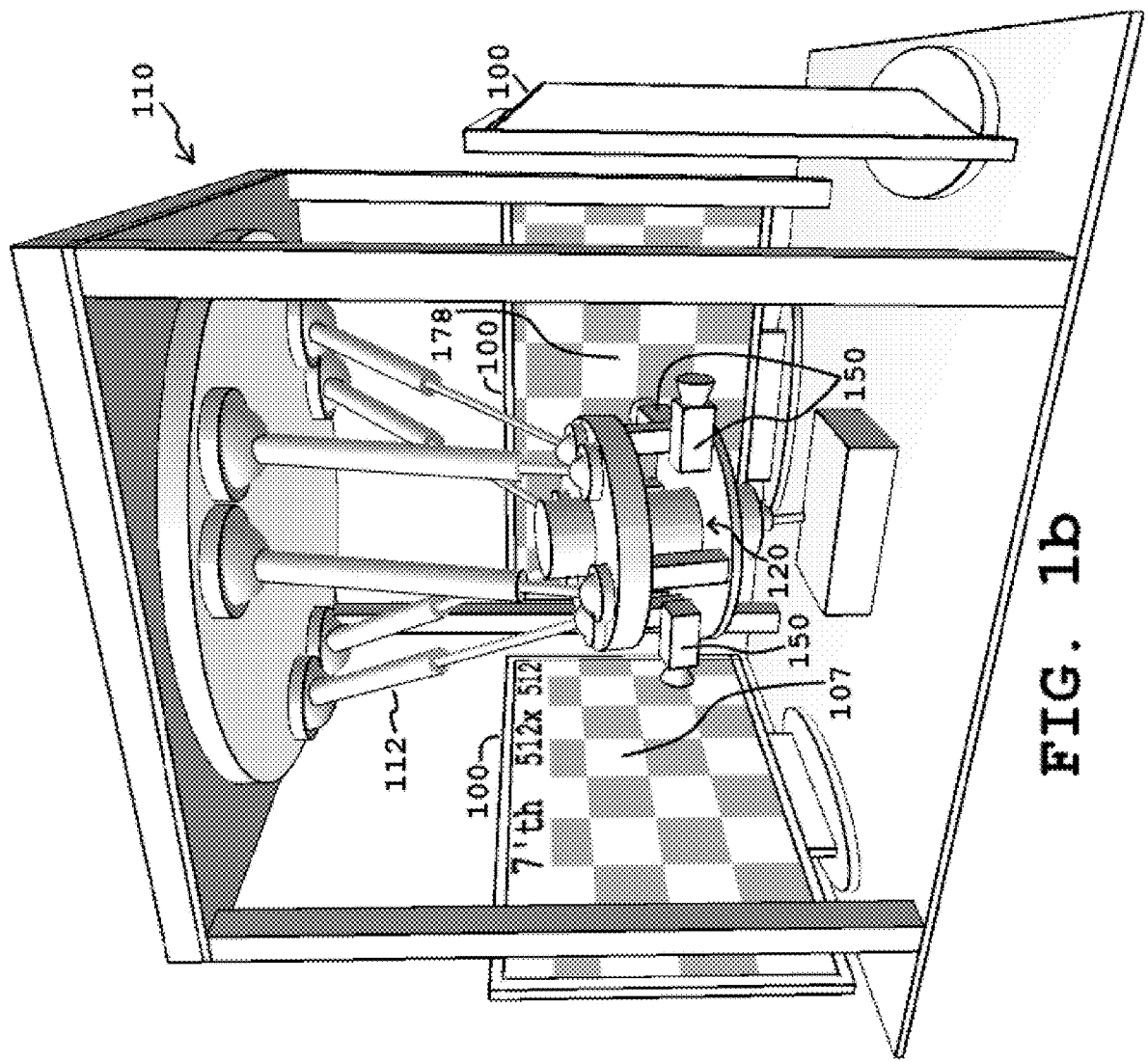
FIGS. 1a and 1b show a sequence of emissive patterns and a perspective view, respectively, for a first illustrative machine tool.
Figure 1A:
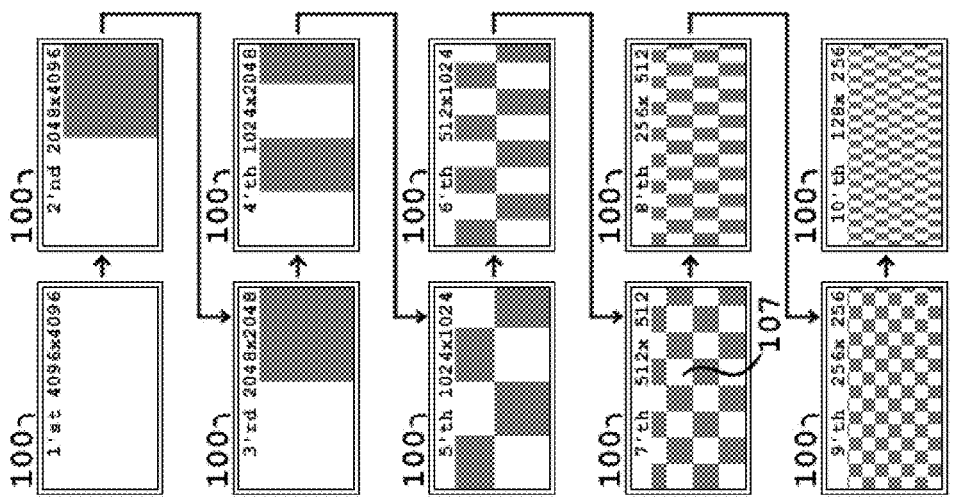

FIG. 1a is a depiction of one embodiment of the Defined Emissive Area Refinement Sequence (DEARS) emissive element identification means and method. The specific depiction is the first ten emissive patterns imposed on a display 100 embodied as an ultra-high definition television (UHD TV), wherein an observed emissive element of one or more proximal emitters has only two distinguishable states. The sequence of patterns starts with a single large area of brightness covering the entire display. This allows the one or more observation devices to confirm that they are pointed at the display 100, and allows adjustments to be made such that subsequent brightness measurements can be made at non-oversaturated levels. Preferred embodiments have observed emissive elements as minimally sized, reliably observable portions of the display (e.g., individual pixels or small groups of pixels). The displays 100 in FIG. 1a are shown with a control-program-code development diagnostic preferred embodiment, wherein the top ⅛ of the display is reserved as an area for human readable descriptors.

The seventh pattern 107 in this sequence has 512-by-512 blocks of pixels, which are either dark or exhibiting fully bright emissivity. The specific pattern sequence depicted is a representative example for sequences that allow each of the emissive elements in a plurality to be individually identified after a finite number of observations. The binary bifurcation pattern depicted has the preferred attribute of allowing lower resolution information to be gleaned, even in situations wherein conditions such as dust, fog, rain, or insect swarms degrade the resolving ability of the observation devices during the observation sequence. At each observation, the position of the observed emissive element can be asserted with a resolution of the sequentially reduced size of the last observed pattern areas.

A random 25-bit binary number assigned to each of the pixels in a UHD TV with the 25-bit planes presented as the emissive pattern sequence would fulfill the present invention sequence requirement of element identifiability, but is not a preferred embodiment. Random assignment gives no positional information until the observation devices has successfully discerned the emissive state of the observed emissive elements during every observation of the sequential emissive patterns.

FIG. 1b is a perspective view depicting an embodiment of the current invention with Stewart-Platform-based machine tool 110 comprising three mounted observation devices 150 pointed at three displays 100. The observation devices 150 are mounted to a platform 120, which is operative to move in response to the actuation of six prismatic actuators 112. In one more non-limiting embodiments, the prismatic actuators 112 may be hydraulic jacks or electric actuators. Preferred embodiments of the displays 100 comprise units of economic-commodity pixelated display hardware having substantial extent, high pixel count, and high pixel density, with these units arranged at substantially orthogonal viewing angles. The displays 100 depicted have the most preferred current embodiment for a large area display: multiple UHD TVs. The machine tool 110 is shown as it makes the seventh observation with one display 100 showing the diagnostic version of pattern 107 from FIG. 1a, and another display 100 showing the preferred production version 178, which uses a greater portion of the display 100 by eliminating the text at the top. Preferred embodiments have observation devices 150 with sufficient magnification, vibration isolation, and focusing capability to use single emissive elements (in this case, single pixels) as observation targets. The most preferred embodiments have these observation devices 150 able to observe emitter image determination on a scale finer than the inter-emissive-element spacing. In the depicted embodiment, this would relate to the sub-pixel resolution required for metalworking.

The observation devices 150 are shown idiomatically as cameras. Preferred embodiments for optics are long-working-distance microscopes for applications with observation devices to display separation of a few centimeters. Preferred embodiments for observation devices 150 are small commodity, high pixel count, solid state cameras. Most preferred embodiments for observation devices 150 are those preferred embodiment cameras which are low cost, and tightly coupled to single board computers with sufficient computational power and software resources to run computer vision applications for the observations and to control the displays 100.

Figure 2:
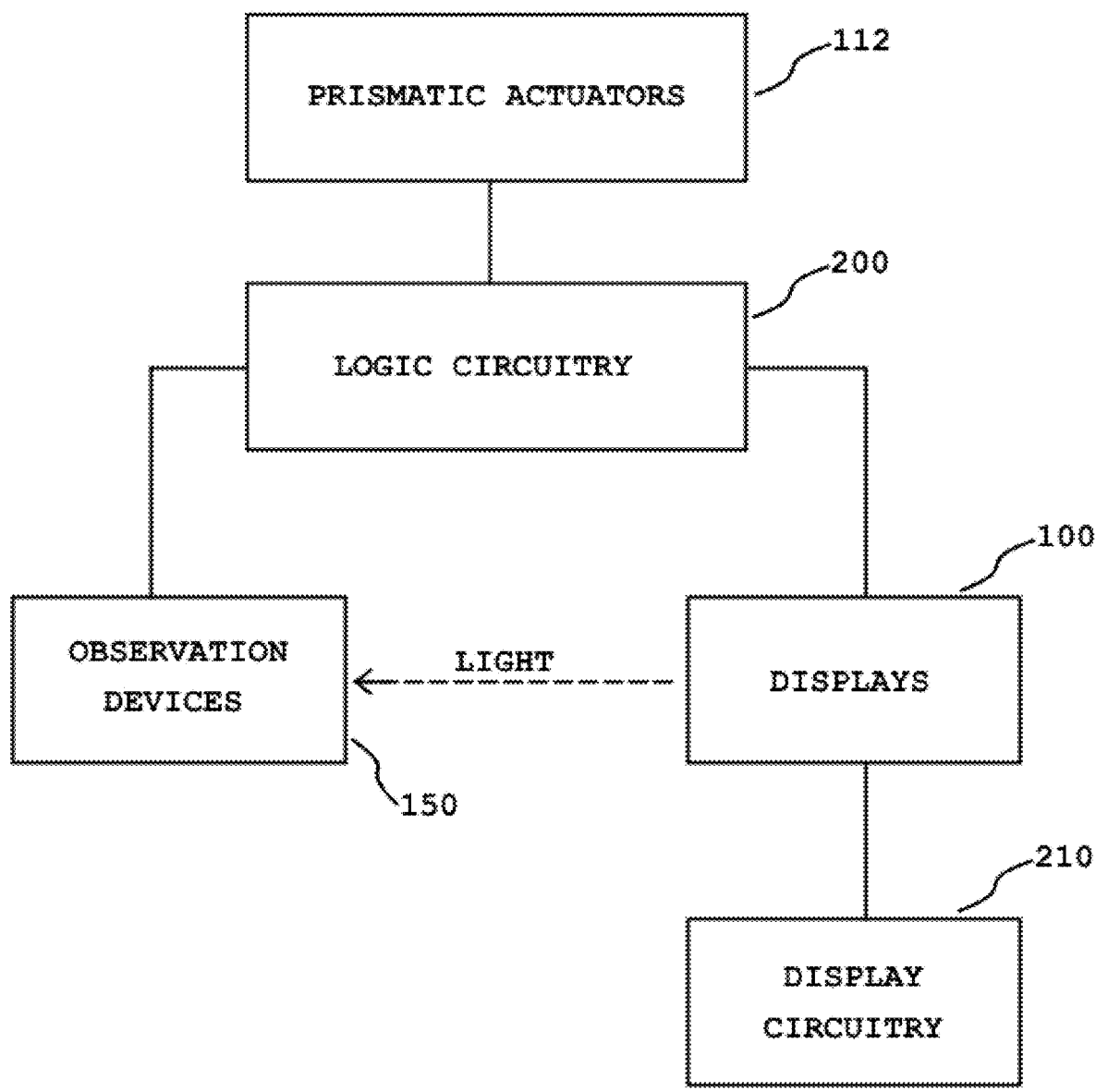
FIG. 2 shows a block diagram of elements within the FIG. 1 machine tool.

FIG. 2 shows a block diagram of the just described machine tool 110 with some additional aspects revealed. In addition to the aforementioned prismatic actuators 112, observation devices 150, and displays 100, the machine tool 110 comprises logic circuitry 200 and display circuitry 210. The logic circuitry 200 and the display circuitry 210 further include respective memories. The logic circuitry 200 drives the prismatic actuators 112 of the machine tool 110, as well as provides computational functions for the observation devices 150. The display circuitry 210 drives the sequence of emissive patterns on the displays 100. While depicted as separate entities on the block diagram, the logic circuitry 200 and the display circuitry 210 may, when reduced to practice, share one or more components. Thus their representation as separate may be merely conceptual. It is also recognized that a machine tool 110 may comprise a number of additional components that are not shown in FIG. 2 (e.g., a user interface, etc.). These omissions are merely for economy of description, and one having skill in the relevant arts would recognize what is required to constitute a working machine.

Advantageously, once understood from the disclosure provided herein, most if not all components of the machine tool 110 may be obtained commercially. For example, in one or more illustrative embodiments, the observation devices 150 may comprise short-working-distance telescopes. Such equipment is available from, for example, CELESTRON® (Torrance, Calif., USA). One or more Raspberry Pi computers can provide the logic circuitry 200 and the display circuitry 210. Such computers and others can be obtained from, for instance, ADAFRUIT INDUSTRIES, LLC (New York, N.Y., USA).

Figure 3:
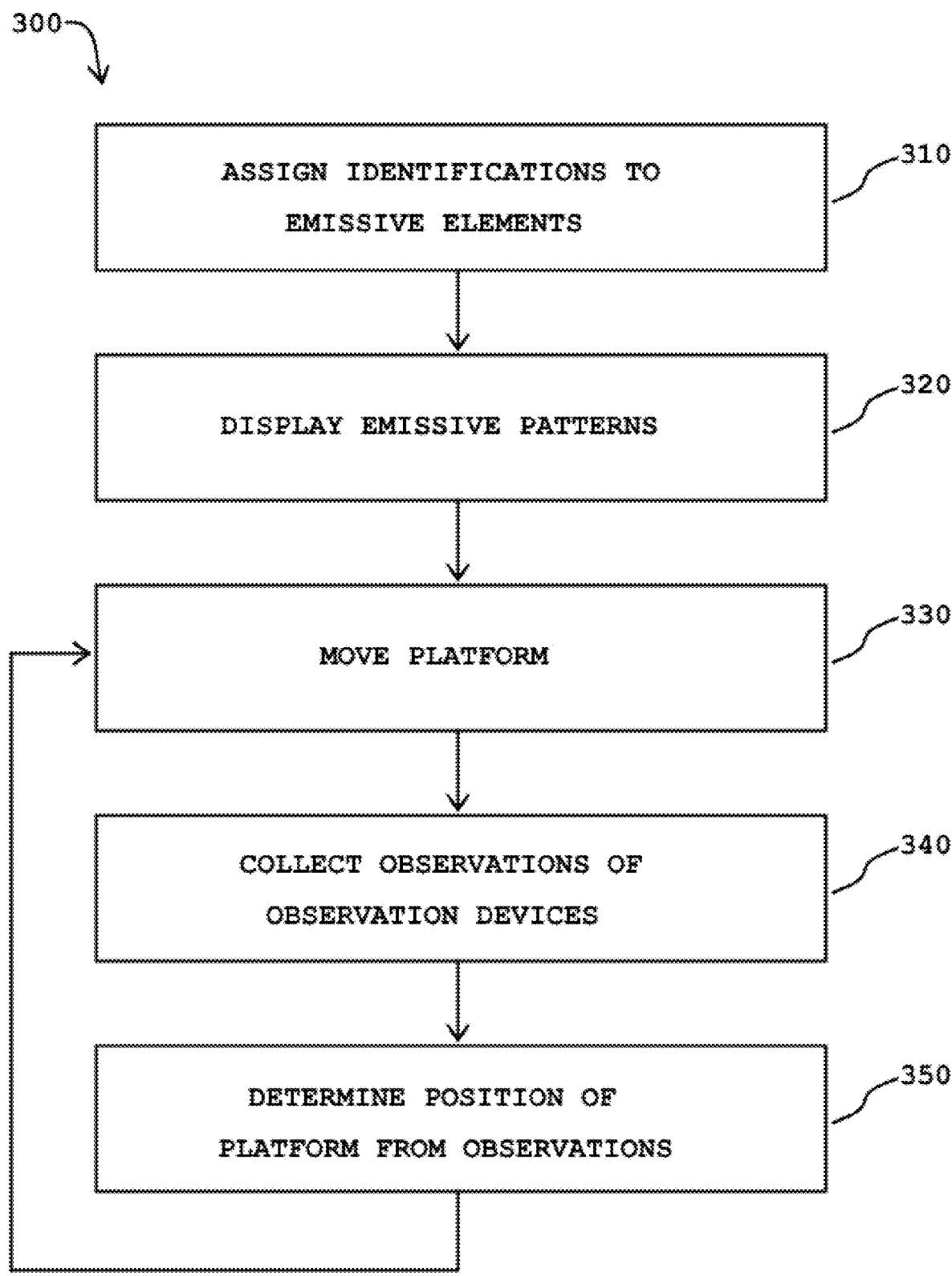
FIG. 3 shows a flow diagram of an illustrative method for using the FIG. 1 machine tool to determine positional information.

FIG. 3 shows a flow diagram of an exemplary method 300 of determining the position of the platform 120 in the machine tool 110. In a first configuration step 310, the logic circuitry 200 assigns unique identifications (IDs) to each of the emissive elements of the displays 100. In a second configuration step 320, the display circuitry 210 makes the sequence of emissive patterns display on the displays 100 in accordance with the IDs assigned in the previous step. The logic circuitry then allows the platform 120 of the machine tool 110 to move in step 330. In step 340, the logic circuitry 200 collects the observations of the observation devices 150, which may be stored in the included memory as required. Finally, in step 350, the logic circuitry 200 determines the position of the platform 120 using the observations of the observation devices 150. The moving of the platform 120 is then allowed to continue as the position of the platform 120 continues to update via the repeating of steps 330-350.

Given the above, one obtains an apparatus comprising: a display (e.g., one of displays 100), an observation device (e.g., one of observation devices 150), logic circuitry (e.g., logic circuitry 200), and display circuitry (e.g., display circuitry 210). The observation device is capable of observing light emitted from a region of the display. At the same time, the display circuitry is operative to cause a sequence of emissive patterns to be displayed on the display. The logic circuitry is operative to determine a position of the observation device relative to the display at least in part from the emitted light observed by the observation device during the displaying of the sequence of emissive patterns. In the present example, the observation device is capable of moving in relation to the display. In contrast, other configurations have a display being operative to move in relation to the observation device.

Figure 4:
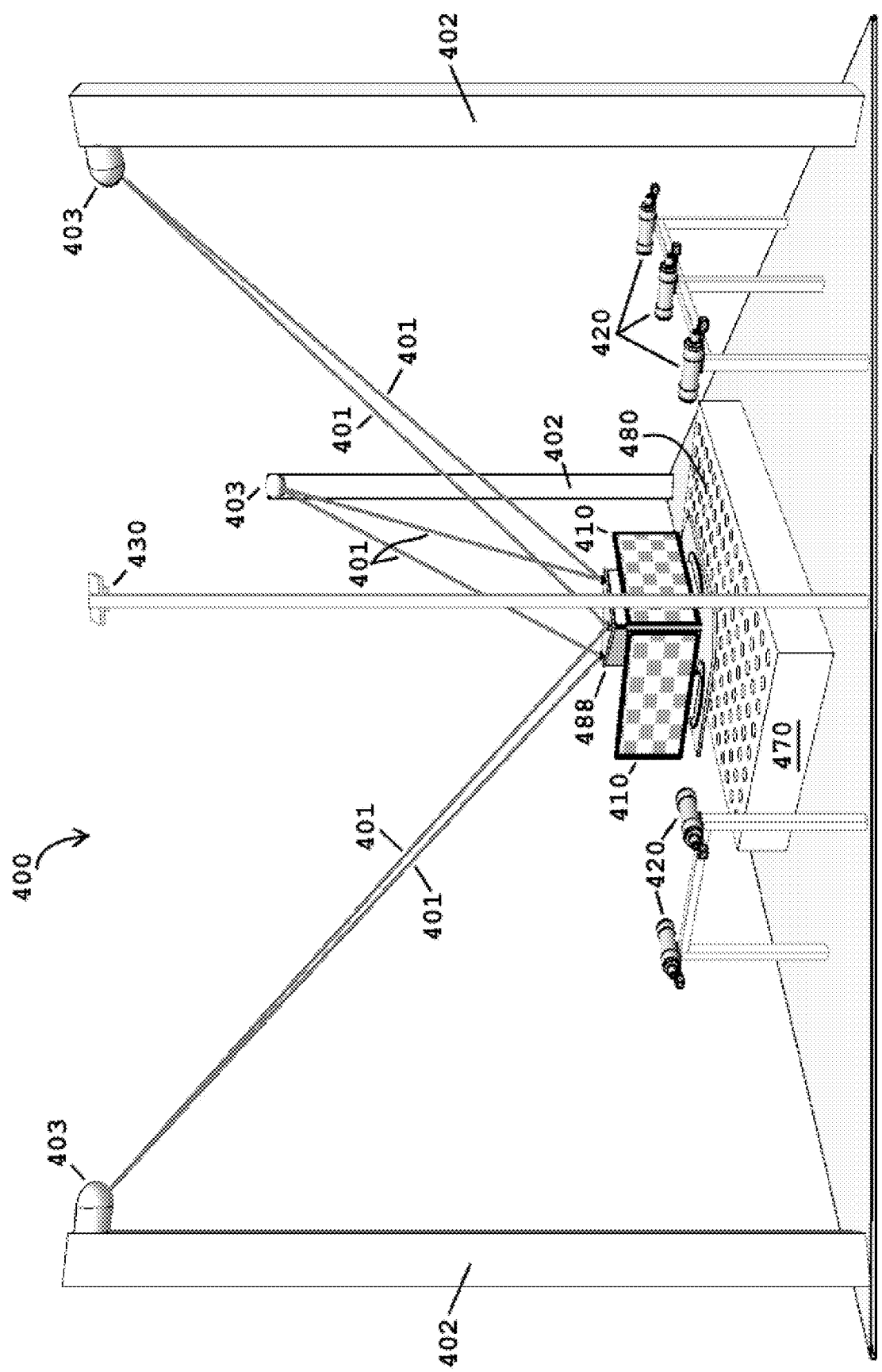
FIG. 4 is a perspective view of a second illustrative machine tool.

FIG. 4 is a perspective view of a tensile-truss-suspended platform machine tool 400 in accordance with another illustrative embodiment of the invention. Opposite to the machine tool 110, the machine tool 400 has movable displays 410 and fixed low-elevation observation devices 420. Upper support means 402 has elongation/retraction means 403 for six cables 401 down to a suspended platform 488, which carries the displays 410 shown as two UHD TVs. The drawing is scaled with the UHD TVs being 43-inch class, and a workpiece platform 470 with vacuum hold down pods 480 capable of supporting a 4x8 foot sheet of plywood or other construction material is provided. The low-elevation observation devices 420 are arranged as two substantially orthogonal banks, wherein the individual low-elevation observation devices 420 are digiscoped short-working-distance telescopes having substantial magnification. Orthogonal observation devices are a preferred embodiment as it allows use of standard machine tool alignment techniques for the setup of the observation devices 420 and maximizes the change in measured position for a given amount of display motion.

An additional high-elevation observation device 430 is shown as a single camera which, in a preferred embodiment, has low magnification so as to be able to view the entirety of one or more of the displays 410 over the full range of motion of the suspended platform 488. In the present non-limiting embodiment, the high-elevation observation device 430 provides supplemental platform angular information by performing emissive element identification on the most widely spaced emissive elements, which are the most preferred elements for determining the three angular degrees of freedom. Those skilled in the art of three-dimensional geometry will recognize the most widely spaced emissive elements give the highest resolution for angular measurements. The embodiment depicted has the spacing of the low-elevation observation devices 420 as slightly less than the width of the displays 410. This ensures that a at least one camera from each of two banks will be able to observe emissive elements.

Digiscoped short-working-distance telescopes are the preferred embodiments for low-elevation observation devices 420 where the distance to the display is a meter or more. The most preferred embodiments of further-than-a-meter observation device optics are large diameter reflector-type telescopes, because of a combination of optical and economic considerations. Large diameter optics are indicated as the focal length (i.e., the distance over which an object is in focus) increases with aperture. This eases the difficulty of achieving and maintaining focus as the displays 410 and the observation devices 420 move toward and away from one another. The time to achieve acceptably in-focus observations is also desirably reduced. The economic consideration is that the cost of telescopes increases more dramatically for the reflector types as the diameter is increased. The largest reflectors are thus typically more economic than refractors. At the time of this disclosure, the diameter at which reflectors are more economic than refractors was assessed as being less than the 90-millimeter optics selected for the first instance of the current invention.

Figure 5:
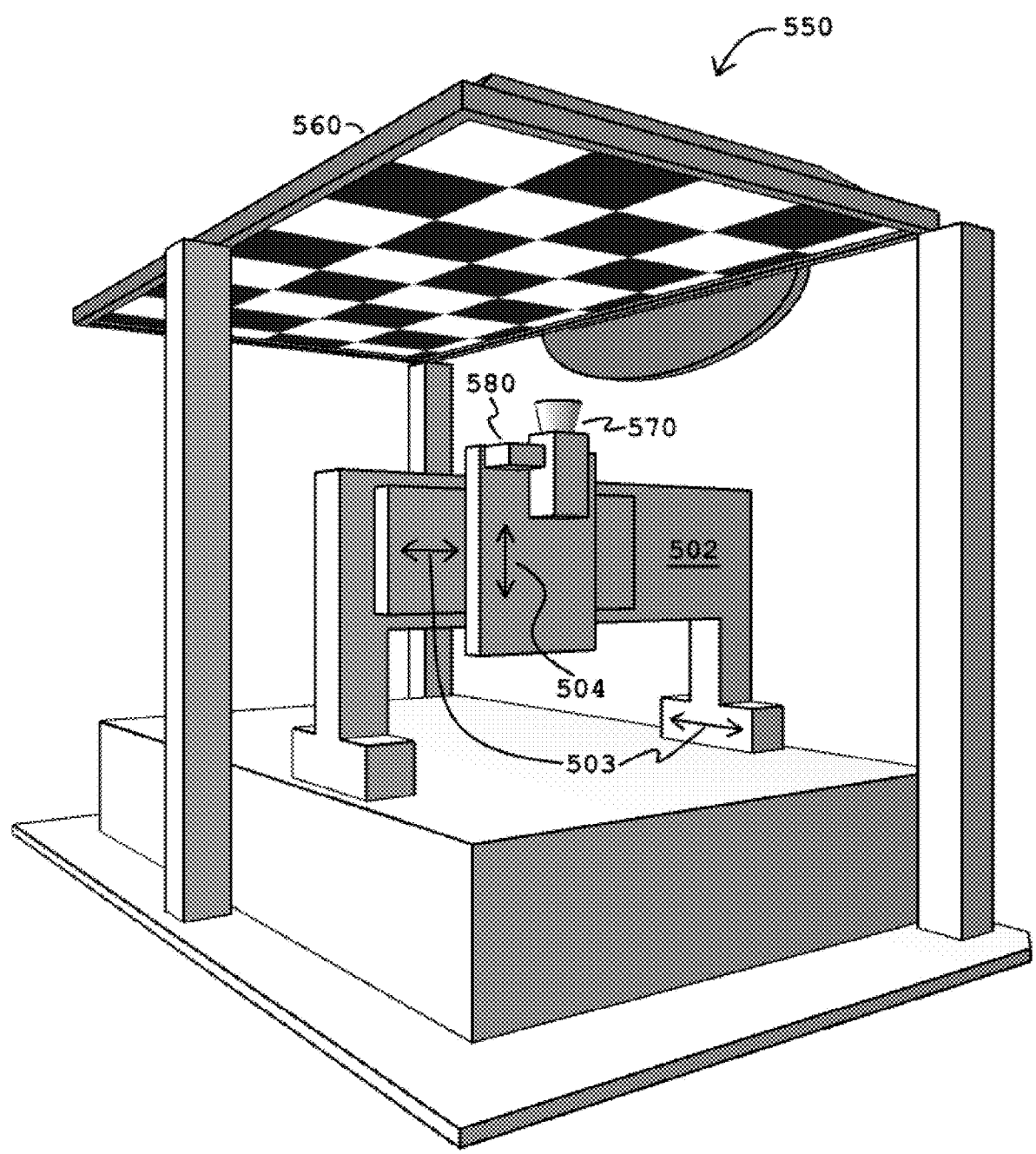
FIG. 5 is a perspective view of a third illustrative machine tool.

FIG. 5 is a gantry-type CNC machine 550 with only three degrees-of-freedom, all of which are translations (represented by arrows 503 and 504). A single planar display 560, embodied as a UHD TV, is supported by pillars at three locations. Support at three locations is a most preferred embodiment as it allows controlled thermal expansion fixturing such as the well-known three-ball double-wedge wedge-and-flat technique described below. The use of the more expensive, lowest thermal expansion materials is contraindicated for commodity display hardware because a slight stretching or shrinkage of the display is of little consequence for the intended commodity viewing applications. Preferred embodiments of the present invention are able to compensate for known thermal-expansion-induced position excursions with temperature measurement and controlled thermal expansion fixturing after representative examples of the commodity hardware has been thermally-expansion calibrated.

Positional information for the two horizontal directions 503 is obtained with the high-magnification observation device 570. Height information for the vertical direction 504 is obtained from at least two widely spaced emissive elements identified through a low-magnification observation device 580. Each observation device 570, 580 has known angles for each of the receptor pixels as part of the calibration procedure for that individual device. The observed angles combine in a simple geometric transform with the known spacing of the identified emissive elements to derive the distance between the display 560 and the low-magnification observation device 580.

FIG. 6a is an embodiment of the present invention wherein the observation devices, the display, the controlling means for expressing the emissive sequence, the computer vision CPU, and software for image capture and emissive element identification are all provided by a single economic commodity unit: a cellular telephone 655 (depicted) or a tablet type computer. Stationary fixture 610 holds an ocular lens 609 over a display-side camera 605 serving as the observation device, and an ocular folding mirror 612. Moving fixture 623 holds an objective lens 608 focused on the cellular telephone 655 serving as the display, as well as moves an objective folding mirror 613, which conveys the image along the parallel paths 606 to the stationary fixture 610 of the optical path. Arrow 611 indicates the major axis of motion achievable with such an optical arrangement, which is to have the elements on moving fixture 623 move toward or away from the ocular elements on the stationary fixture 610. Preferred embodiments have the objective elements of smaller size than the ocular elements, so as to enable measurement orthogonal to direction 611. The bounds of the motion indicated by index 611 are the edge of the display away from the camera end of the cellular telephone 655 and the need to have the elements held by fixtures 610, 623 not collide with one another. The measurable distance orthogonal to motion direction 611 is bounded by the extent to which the image of folding mirror 613 projects onto mirror 612. For linear motion, this is the difference in the sizes of the two mirrors 612, 613. Economic measurement of non-rotating movements are easily achieved over areas of 3×8 centimeters with embodiments of this type using conventional cellular telephones.

A three-ball, double-wedge, wedge-and-flat controlled thermal expansion fixture (comprising balls 600, double-wedge 601, wedge 602, flat 603, and plate 615) is shown in side view in FIG. 4a, and in top-down view in FIG. 4b (with hidden elements in FIG. 4b shown in broken lines). This thermal expansion fixture assures that the unit being supported (i.e., cellular telephone 655) thermally expands around a predefined, invariant location in repeatable directions. The three balls 600 are affixed to the cellular telephone 655 by adhesive or mechanical means (not shown). The double-wedge 601 acts to constrain the expansion of the cellular telephone 655 to be about the center of the double-wedge ball. Wedge 602 is aligned with its axis directed at the double-wedge 601. When cellular telephone 655 expands, the ball 600 in wedge 601 will slide with little resistance along the wedge 601 without changing height. In a similar manner, a change in temperature in cellular telephone 655 causes the ball on flat 603 to move in the plane of the three balls 600. The instance depicted uses gravity to keep the balls 600 in good contact with the surfaces of the double-wedge 601, the wedge 602, and the flat 603. Mechanical elastic springs retention can also be employed. Applications where the cellular telephone 655 is vertical can have the double-wedge 601 and the wedge 602 at a single elevation with the flat 603 at a different elevation. These types of fixturing do not restrain or lessen the extent of temperature-driven dimension changes. They do cause the expansion to occur about a well-defined location, in controlled and well-defined directions. Controlled thermal expansion fixtures, in conjunction with temperature measurements, allow easy calculation of, and compensation for, thermal expansion effects which would otherwise express as measurement error. Notably, while the above-described thermal expansion fixturing is applied to the cellular telephone 655, similar fixturing may, in other embodiments, be applied to a display such as a UHD TV and/or to an observation device.

In one or more embodiments, aspects of FIG. 6a can be utilized to replace the double-banked and triple-banked low-elevation observation devices 420 in the machine tool 400 (FIG. 4) with a single respective observation device having the capability to swivel. FIG. 7 depicts an economic embodiment of such a swiveling observation device, which allows a rotating platform 716 supporting a single observation device 700, shown here idiomatically, to swivel on an air bearing around a central shaft 721. This rotation (as well as the above-described translational motion) is measured by two cellular telephones 655' and 655'', which are configured in a manner like the cellular telephone 655 in FIG. 6a, allowing like elements to be numbered with like reference numerals for economy of description. These cellular telephones 655', 655'' are attached to the rotating platform by arms 723. The sideways motion of the platform 716 is constrained by no mechanism other than the bearings in motor 719 connected to horizontal baseplate 715 by a flexible shaft coupling, such as the Oldham- or zero-backlash type. Preferred embodiments have motion-limiting stops and retention brackets (both of which are not shown) to limit the motion of the platform 716 so as not to exceed the elastic limits of the flexible coupling. An opening 720 in the platform 716 allows passage of both the motor shaft 721 and pressurized air constrained by a dome shaped bladder, the outline of which is shown as index 718. Counterbalancing of the platform 716 is indicated by weight 722. The broad area 724 depicts the two-dimensional area on the cellular telephones 655', 655'' over which emissive element identification occurs as the platform 716 swivels. The +/−10 degree rotation depicted is enough to allow replacement of either bank of multiple high-magnification observation devices 420 in FIG. 4 with a single respective observation device fixtured according to FIG. 7 for Celectron-m90-based observation devices, with their minimum focal distance of 4.5 meters. The two measurements of two-dimensional positions from the FIG. 7 fixture give good positional information on the observation device 700. The distance between the two measured locations within the objective lenses 608 can also be used to determine a rotational angle. Applications which desire increased resolution on the rotational angle can achieve this by making observations through observation device 700 on a ruled scale positioned beyond the workpiece.

FIGS. 8*a*-8*g* depict one of the ways in which a sequence of emissive patterns can be generated to enable identification of any given emissive member (e.g., pixel) of a display. The example presented uses the equiaxed orthogonal pixel format of the most common commodity displays such as TVs, computer monitors, cellular telephones, and tablet computers. The example in this figure uses the minimal number of distinguishable emissive states, namely, two. The example in this figure is also extended to the size of the largest currently available commodity hardware expression: a UHD TV that has 3840×2160 pixels. That said, the principals involved in the sequence progression may apply to any display.

Table 800 relates the unit cell building blocks which are tessellated to whatever extent is necessary to cover the area of the display. A unit cell is a proximal grouping of pixels which have the same emissive state, either all dark, or all bright. The left column is how many pixels are in each tessellable unit cell. Each row of the table relates to one of the sequential emissive patterns used in the DEARS embodiments of the present invention. In generating a sequence of emissive patterns, the tactic of starting with tessellations of unit cell groups containing one unit cell having each of the emissive states has proven useful. One then morphs this into a larger unit cells by replacing the full extent of the prior unit cell group with unit cells having each of the emissive states. This repeats until the full display is covered by a single emissive state. With only two emissive states, this morphing requires two steps, from 1:2 aspect ratio rectangle to square, and then from square to rectangle. Unit cell group 801 is comprised of a unit cell with one dark pixel and a unit cell with one bright pixel. There is no advantage to any of the 4 ways to arrange these two pixels, making the shown selection of a 1-wide×2-tall rectangle with dark on top a purely arbitrary choice. Index 811 through 816 depict 16×16 pixel tessellations of the adjacent unit cell groups, which display the preferred checkerboard arrangement. The alternative arrangement of having stripes of dark and stripes of white give identical ability and efficiency in identifying the individual emissive elements selected for observation. Nevertheless, non-axisymmetric solutions are less preferred because they potentially impose greater stress on the display hardware. If the stripes are chosen in the same direction as the power feed to the driver circuits, rows will be alternate from full power draw on all elements, to zero power draw. The checkerboard causes less stress because all rows will tend to always have half the maximum power draw. Table 800 ends after 25 rows because the size of the pixels per unit cell group (4096) exceeds the larger dimension of the example target.

Figure 9:
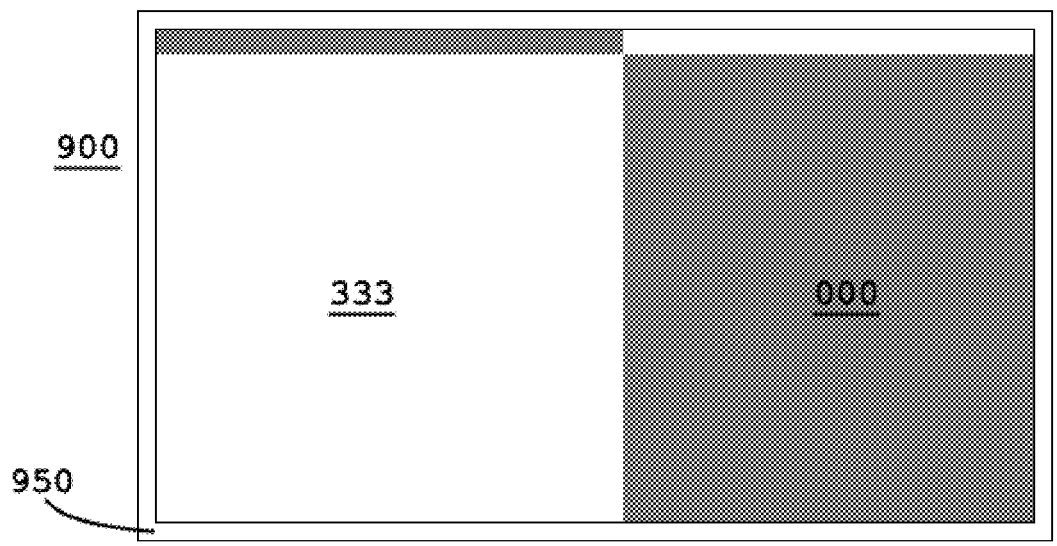
FIG. 9 shows an illustrative binary emissive pattern on a UHD TV.

FIG. 9 depicts an exemplary way in which the 2048×2048 pixels per unit cell pattern (third row from the bottom of table 800 in FIG. 8*a*) can be applied to a UHD TV 900 (i.e., display). The non-emitting bezel is shown as index 950. The overlay shown has one of the units, in this case a bright unit cell 333, fully expressed in one of the corners. The horizontally adjacent unit cell, in this case a dark unit cell 000, extends beyond the edge of the display and is thus only partially expressed. The two other unit cells have only a thin 2160−2048=112 height of their pixels expressed by the TV 900. This non-axisymmetric solution is preferred over having the juncture of the four unit cells in the center of the display because of programming considerations related to a preference for using unsigned integers for pixel indices, which is in turn derived from a desire to avoid the behavior of modulo math at negative one.

Displays with the ability to emit more than two emissive states are now considered, namely color displays. FIG. 10*a* is a representation of a pattern with emissive elements exhibiting eight distinguishable states characterized by pixels having three-colored emissive sub-pixels, with each of these colors being either dark or fully emissive. The sequence generation portrayed in this figure has the same alternation of 1:2 ratio rectangles and squares. FIG. 10*a* is the initial, smallest unit cell with eight emissive elements. FIG. 10*b* is a key which relates the reference indices to the relative amounts of the three-emissive sub-pixel elements, labeled "r" for red, "g" for green, and "b" for blue. The N8 column is the base-8 number which can be used to correlate a position within a tessellation to a unique identification for an emissive element.

FIG. 10*c* is the second in the sequence of unit cells, where each of the emissive elements from FIG. 10*a* has been replaced by eight elements. With these two emissive patterns, 64 emissive elements may be identified. It will be appreciated by those skilled in exponential growth that every subsequent iteration multiplies the number of individual emissive elements that can be identified by a unique sequence of distinguishable states. This sequence is able to uniquely identify any pixel on a UHD TV after 12 steps, as opposed to the 25 steps needed by emitters with only two distinguishable emissive states.

FIG. 11 is a representation of the emissive isotropy commonly found in commodity display embodiments. Displays sold as computer monitors and as cellular telephones generally have this phenomenon to a lesser extent than those sold as televisions. This is because televisions are expected to be viewed from a smaller range of oblique angles, and this TV-user space is optimized for other aspects of emitter characteristics such as brightness. The figure is an isometric depiction with emissive element 1121 in the plane 1120 of the display. Relatively long ray 1122 represents the direction orthogonal to the emitter plane, and is of maximal brightness. Relatively short ray 1123 represents a direction more parallel to the emitter plane 1120, and as such is of lesser brightness. Preferred embodiments of the present invention seek to maximize the number of discernable brightness levels. The effects of anisotropic emissivity on observed brightness are part of preferred embodiment setup procedures for determining the number of brightness levels which can be used in any implementation of the current invention, wherein the observations are at differing angles to any planar regions in the display. Most preferred embodiments will also include a full brightness calibration/observation for each emissive element in the emissive pattern sequence. This serves to both confirm continued function on the part of the emitter, and to allow observation device adjustments to be made so that the required number of emissive states can be reliably distinguished. One such adjustment for a charge-coupled-device-type (CCD-type) of observation device is to change the length of time for photon absorption to give a readout value near the maximum reportable value for these full brightness observations.

FIG. 12 is a representation of emissive elements which have four distinguishable brightness states on each of three colored pixel sub-elements. FIG. 12*a* is an array of the 64 distinguishable emissive states as the initial, smallest unit cell. The pixel emissive elements are shown with the square pixel geometry bounded by the heavier lines. The three-colored emitters in each pixel allocate roughly ⅓ of each square and are shown with lines of minimal weight. FIG.

12b is a key relating the numbers in FIG. 12a to brightness levels with 0 shown as a dark grey representing black, and 3 is shown as white representing maximum brightness, as well as two intermediate brightness levels. FIG. 12c uses the grey levels to present the same 64-element unit cell as FIG. 12a. Here the intra-color division lines have been omitted, and the inter-pixel boundaries are lines of minimal weight. The FIG. 12c greyscale representation is able to present these 64 distinguishable states in more compact form. FIG. 12d is the second in the sequence of emissive patterns, with 4096 emissive elements being uniquely identifiable after two iterations. Each of the pixels in a UHD TV can be identified after only three pattern iterations.

In the above-described DEARS embodiments, a single distinguishable state is imposed on proximal emissive elements for each of the successive patterns, with the extent of each single emissive state proximal region being reduced for each successive pattern. Distinguishable emissive states are created using one or more of brightness and color. The preferred embodiment of this type uses the maximum number of reliably discernable emissive states to minimize the number of patterns required to achieve emissive element identification. In other embodiments falling under aspects of the invention, a sequence of patterns expressed over multiple emissive element groups present a group of patterns which are distinguishable to define any emissive element as belonging to a single group, and which present characteristics uniquely identifying that individual group. This may be called a Multiple Element Group Single Observation Resolution (MEGSOR) operation mode. Preferred MEGSOR embodiments include in the sequence an emissive state of substantial brightness for each of the group elements. The state of substantial brightness may serve to verify continued emissive function, and to calibrate observed brightness levels.

MEGSOR can be used when the observation devices have sufficient magnification such that the field-of-view (FOV) spans five or more emissive elements and the resolving power of the observation devices is able to distinguish a FOV dependent number of brightness levels in each of the observed emissive elements. The number of brightness levels required for MEGSOR increases with the size of the display.

FIGS. 13 and 14 depict embodiments of MEGSOR for FOVs spanning 21- and 13-emissive elements, respectively, on displays having UHD TV quantities of emissive elements. For illustrative purposes, in FIG. 13 with the 21-element span, each pixel is allowed to take on only binary states. Later, in FIG. 14 with the 13-element span, each pixel is allowed to take on four brightness levels. Both embodiments can be economically implemented with UHD TVs (e.g., 43-inch types) and commodity observation devices, and both embodiments provide resolutions small enough to be appropriate for metalworking despite using groups of pixels for position identification rather than individual pixels.

FIG. 13 depicts the first three unique multiple-element-group (MEG) ID numbers encoded for the top seven rows in the upper left corner of a 21-element MEG, two-emissivity level MEGSOR embodiment. Index 1311 indicates a row displaying the individual MEG IDs. FIG. 10b is a color key relating the grey and white representations for 0 and 1, respectively, in the two alternating patterns, depicted as FIGS. 13c and 13d. In any given sequence, half of the rows express IDs in a ID-full-bright condition, which allows the observation devices to both verify the continuing function of each emitter, and allows adjustment of the observation device brightness control to give maximum measured difference among the distinguishable emissive states in a timely, and spatially identical set of measurements. The rows which can express ID numbers, but which are in their ID-full-bright phase are shown as index 1313. Every ID-full-bright 1313-row in FIG. 13c is an ID-displaying 1311-row in FIG. 13d. Every ID-displaying 1311-row in FIG. 13c is an ID-full-bright 1313-row in FIG. 13d.

Preferred embodiments remember the brightness measured for each element in the 1313-row and use that in assessing the brightness state of each element in the next toggled pattern. An operational coupling between the display circuitry for the emissive patterns and the logic circuitry for the observation devices may provide a trigger so the logic circuitry knows when a toggle occurs. Such coupling can be through direct interprocess communication using any of the several common communication technologies of Ethernet, Bluetooth, wireless, or hardwire IO, or can be through indirect means such as state expressions in a database, file, or other medium able to handle multiple updates per second.

To further facilitate the MEGSOR operation mode, every MEG needs to have a positional marker so that the beginning and end of the MEG can be unambiguously known. The embodiment shown as FIGS. 10c and 10d use the method of having one-and-only-one column of emissive elements having an invariant emissive state. That is, one column maintains an unchanging emissive state (e.g., all-dark) during the sequence of emissive patterns. The all-dark-column 1310 is the preferred embodiment of this single-emissivity column as the alternative full-bright column would require more complicated programming associated with the construction and interpretation of the space-enhancing 1312-rows by forcing them to be all-but-one-dark rows. This requirement has the effect of reducing the number of emissive elements which are available for ID encoding by one. In the present case, the 21-element MEG has 20 binary digits for ID encoding. This puts the number of IDs encodable by a 21 element MEG as 2 to the 20th power minus 1=1,048,575.

If every row in the example UHD TV example had been an ID-display-capable row, the number of MEGs would have exceeded the number of unique IDs expressible with 20 binary emitters by less than double. The 4×3 width-by-height FOV 1309 shown as a crosshatched rectangle has enough height to always display one or more ID-displaying 1311-rows even with every other row permanently displaying an all-dark 1312-row state.

By reducing the number of rows needing unique ID numbers, the MEGSOR implementations can expand the size of the display over which a given number of emissive states can uniquely identify one or more MEG at every observation. With the number of ID displayable 1311-rows halved to 1080, the 21-emissive-element MEG can have 548 complete expressions on each row, so the total number of IDs required for this application are 1080*548=591,840.

By employing sufficient observation device magnification such that the FOV is limited to only a few display pixels, the positional resolution of the apparatus is determined by the specificity of the observation device light gathering cell to which the image of an identified display pixel can be fixed. In the observation device, FOV 1309 is divided into a substantial number of individual light gathering cells (1640× 1232=2,020,480 for an example commodity observation device: the Raspberry Pi V2 camera). A limit on the resolution of the apparatus is the FOV width divided by the number of light gathering cells across the width of the observation device. For the present example, that resolution limit would be determined from 0.2452 mm per display pixel, FOV width of 21.5/3 pixels, and 1640 observation device light gathering cells across this same FOV width. These combine to give 0.0011 mm per observation device light gathering cell. Engineering practice is to recognize that achievable resolution is degraded somewhat from this limit, with a resolution of three observation device cells seen as achievable, and a resolution of only ten observation device cells relatively easily achievable.

With the number expressible being larger than the number required, the choice of what ID will start the sequence needs to be made. The preferred embodiment is to select the total number of IDs as the starting point. This will cause the last MEG to have value one, which enables an easy check of the pattern formation logic. Selection of a number one lower than the total number of IDs will cause the last MEG to have a 0 value, which will conflict with the all-dark 1312-row values. All other choices are not preferred as they are arbitrary and require conveying additional information to be able to use the method.

An additional constraint on the ID numbers allows smaller FOV implementations. This constraint is to have the ID numbers used for a first MEG and its neighboring second MEG within a row having an algebraic relationship, which allows the least significant digits of the second MEG to be constructible from the least significant digits of the first MEG, for any number of first-MEG-visible least significant digits. The simplest version of this constraint is to have the ID numbers expressed in the element emission patterns conform to the digit order commonly used, with the most significant digit being the leftmost and each subsequent digit to the right representing a smaller and smaller quantity, along with having the number to the right represent a number incremented or decremented by one. This is the most preferred embodiment as other possible digit orderings and neighboring MEG algebraic relationships increase confusion and add no value.

The FOV 1309 may not always fall squarely on a single MEG, but may instead fall on the border between two MEGs. The 1314-row will be used as an example of how to decode an ID from only what is observable within the FOV 1309 on that row, independent of whether the FOV 1309 is on a border or not. The current example has a minimal sized FOV, being as wide as 21.5 emissive elements, but substantially larger FOVs can be used with this same 21-emitter MEG. In these larger FOV implementations, multiple all-dark 1310-columns will be visible. A single all-dark 1310-column is selected by some simple criterion such as using the leftmost. The zero or more emissive elements to the left of the selected 1310-column are the least significant digits of a first MEG. The zero or more emissive elements to the right of the selected 1310-column are the most significant digits of a second MEG. The number and values of the first MEG least significant digits are used to construct the least significant digits of the second MEG using the known algebraic relation between neighboring MEGs. In this case the algebraic relationship is the first MEG is one larger than the second MEG. The number and values of the most significant digits of the second MEG are obtained from the image. If the number of first MEG least significant digits is greater than zero and each of the digits are 0, the second MEG most significant digits will need to be decremented by one. An ID is assembled by putting the resulting most significant digits into their respective digit positions, and the constructed least significant digits are placed into their respective digit positions. The normal and expected condition for FOVs which are of more than minimal size is that some of the middle digit positions will be addressed in both of these emplacement operations. If the numbers inserted from the two emplacement operations are not the same, an error has occurred. For non-error conditions, the ID resulting from emplacing the digits into the 20 ID-encoding-digit locations is the ID of the MEG just to the right of the all-dark 1310-column.

FIG. 14 is a depiction of a MEGSOR embodiment which has 13 emissive elements and four distinguishable emissive levels. The example application is a UHD TV. The FOV encompassing a width of 13.5 emissive elements is not tall enough to accommodate all-dark 1312-rows in the manner of the previous embodiment. Instead, an equivalent all-dark column 1410 is formed by the alternating toggle of the ID-capable-rows from an ID-display format 1411 to an ID-full-bright format 1413. The ID numbers are larger because of two factors: the smaller MEG size allows more iterations per row, and the absence of the every-other-row all-dark rows doubles the number of rows which express IDs. The method for decoding the portion of interpreted row 1414 within FOV 1409 is unchanged from that described for FIG. 13, bearing in mind that the transform from four brightness levels will represent base-4 numbers.

The illustrative MEGSOR embodiments represented in FIGS. 13 and 14 utilize a sequence of emissive patterns to facilitate the presentation of all-dark columns 1310, 1410 for marking the boundaries of MEGs, as well as ID-full-bright rows 1313, 1413 for calibration purposes. Nevertheless, in other embodiments falling within the scope of the invention, such a sequence of emissive patterns can be replaced by a single emissive pattern and positional information still reliably determined. More particularly, in a configuration wherein a FOV is large enough to resolve multiple MEGs, the IDs of those multiple MEGs can be obtained from a single emissive pattern. The integrity of the IDs may then be verified for a target MEG by confirming its relationship to the IDs corresponding to the MEGs to its left, its right, or both. Because of the above-described intra-row algebraic ID relationships, the ID corresponding to the MEG to the left of the target MEG should have an ID one greater than the ID for the target MEG. The ID corresponding to the MEG to the right of the target MEG should have an ID one less than the ID for the target MEG. Similarly, preferred embodiments have MEGSOR IDs of known relation to the MEGSORs in the rows above and below. The simplest of these is to have the IDs in the row below be decremented by the number of MEGSORs that fit on a row. This allows additional confirmation of correct ID interpretation to be made from the MEGSORs identifiable when multiple rows are visible within the FOV. If these relationships hold, then measurement integrity is almost certain despite having foregone the regular calibrations to all-bright rows facilitated by multiple emissive patterns.

FIGS. 15*a*-15*c* present a set of calculations for a representative MEGSOR embodiment of the current invention. FIG. 15*a* enumerates relevant quantities for both an element of the observation devices and an element of the display. FIG. 15*b* enumerates some dimensions relevant to metalworking requirements commonly used for incremental indicators, dimensions, and tolerances. FIG. 15*b* also includes a looser measurement more appropriate for woodworking applications, and two measurements from a UHD TV having the smallest commodity pixel size: the 43-inch class.

FIG. 15*c* relates the FOV obtained through use of an appropriate magnification means to sets of resulting MEGSOR parameters. The smallest MEGSOR implementation with three-color emitters corresponds to using each pixel as the full extent of the MEG. The ability of the observation devices to distinguish among the emitters by color allows this MEGSOR to not need an additional allocation of a fourth emitter bar as an inter-MEG positional marker. The 203 brightness levels required for single observation identification of the required number of MEGSORs may presently be unworkable with current commodity hardware.

All of the larger FOV MEGSOR applications use one emitter as this positional marker, so the number of emitters available for encoding the ID number for an individual group will be one less than the number in the table. The quantity of IDs is the number of complete MEGs which fit on a row, multiplied by the number of rows exhibiting IDs. For those FOVs with an ID-able row period of one, the number of rows exhibiting IDs is the full row-count of the display, or of half this number where the period is two. The brightness levels reflect the smallest base number which is raised to the power of the number of ID-usable color bars, which is larger than or equal to the quantity of IDs required. One example case is that a ten-emitter MEGSOR can present a full UHD TV quantity of identifiable groups using seven brightness levels on each of its nine position-indicating emitters. The remaining columns reflect the number of camera pixels available to attempt to resolve features of the several sizes in the several columns.

Preferences exist among the several columns, but are diametrically opposed in the case of preferring fewer brightness levels and preferring more camera pixels on an observed feature or group of features. The preferred condition is to have the number of imaging receptors on an observed object as three or greater. In this condition the feature isolation and associated position assertion is resolvable. The most preferred condition is to have the number of imaging receptors on an observed object as ten or greater. In this condition the feature isolation and associated position assertion is easily resolvable.

The preferred condition for quantity of brightness levels is to have 16 or fewer with the most preferred quantity as three or two. The numbers of colors required for identification of the example UHD TV sized display overlaps with the observation devices imaging elements per observed feature to give a substantial FOV range in which metalworking resolution occurs. The preferred region for metalworking is, for example, an FOV between 1.349 and 0.613 mm. The most preferred region is an FOV between 0.776 and 0.695 mm. For woodworking applications, the preferred FOV is from 44.881 to 1.757 mm and the most preferred region is from 14.240 to 1.757 mm.

Observation devices which have adjustable magnification can be used with the present invention, but may be more expensive in at least two aspects. The hardware to allow the zooming action represents an additional initial cost for the system, and the ongoing adjustments represents additional burden on the controlling means (e.g., logic circuitry). Any additional adjustable mechanical assemblage also introduces additional opportunities for resolution degradation. The preferred solutions are therefore those with fixed magnification. The most preferred solutions are those in which the minimal number of optical components produce FOVs on the display at both the near and far working distances that are within the most preferred FOV regions stated above and the patterns expressed are operationally coupled through assessments of the ongoing working distance to use a MEGSOR version which uses the least number of brightness levels.

Another aspect of simplicity as the preferred embodiment relates to the number of optical components in the observation devices. Two techniques for attaching commodity digital cameras to telescopes are presented in the literature. One technique is to retain the telescope ocular lens and retain the camera lens. This allows selection of the functional magnification by choosing from among a number of eyepiece focal lengths. The objective lens and the camera lens add geometric and chromatic distortions. The preferred solution is to remove both the eyepiece and the camera lens, so as to have the parallel rays within the telescope optical path impinge directly on the camera's silicon detector.

Yet another embodiment allows positional measurement from observation of a single emissive pattern within an adaptively moving, energized sub-region of the display, after an initial static positional relationship has been established. This is useful in that position measurements can be made while the observation devices and the displays are in relative motion. That is, a displayed emissive pattern dynamically moves across the display in response to the relative motion of its observation device, causing two or more emissive patterns in a sequence to consist of a like pattern that is centered on different points on the display. FIGS. 16a-16c depict an adaptive MEGSOR embodiment which displays only a limited number of identifiable groups in order to limit the number of brightness levels required. The example embodiment presented uses ten elements to form each group and requires only two brightness levels to display 509 identifiable groups. One application space for MEGSOR embodiments with limited quantities of identifiable groups are applications where indication of position is desired while the observation devices and the display are in relative motion, and the observation devices has a FOV small enough that identification of MEGSOR groups over the full extent of the display would require substantially more brightness levels. In operation, the energized sub-region of the display would be operationally coupled to the movement controlling means to allow frequent re-centering of the energized region onto the expected intersection of an observation devices direction with the display.

FIG. 16a is a magnified depiction of the lowest two emitter rows in a display pattern shown in FIG. 16c. FIG. 16b is the key relating the binary emissive levels to the grey and white levels used in the drawing. Index row 1613 has only a single differentiated emitter which serves to designate the uninterrupted single-emissivity boundary defining columns 1610. Those skilled in the binary arts will recognize that indices 1 through 7 bracket the binary representations for 1 through 7 on the index 1611-labeled row. FIG. 16c represents an emissive region of a display which would be energized in a roughly circular region of approximately 14-mm diameter, appropriate when the uncertainty in the two orthogonal directions is roughly equal. If the uncertainty in the two directions were not equal, the preferred embodiment would be to have the energized region be an ellipse with the longer axis extending in the direction of greater positional uncertainty.

While a platform is moving, a different set of emitters would be observed on each observation. This exposes the observations to errors from occluded emitters as there is no opportunity to confirm good observable emissivity prior to the measuring observation being made. MEGSOR emitter-quantity-minimization has the effect of maximizing the observation devices to display distances over which multiple MEGSOR are simultaneously observable, allowing for redundant verification of positional indications. Limiting of the number of brightness levels maximizes the ability to correctly distinguish emissive states through image obscurations such as intervening dust or insect waste. The preferred embodiment for moving measurements is to minimize the number of brightness levels, and to minimize the number of emitters in the MEGSOR. The most preferred embodiments have only two emissive brightness states, and limit the number of MEGSOR emissive elements such that the moving energized region within the display extends to only a small extent beyond the position the observation direction is certain to intersect the display. Preferred embodiments will be those with timing tolerances on the display-to-observation coupling, such that emissive regions no greater than 100× the required positional resolution are required to ensure the observation will be made on one of the moving emissive region MEGSOR elements.

FIGS. 17a-17d present some calculations for MEGSOR embodiments on an example UHD TV display. The example case of a ten-element MEGSOR would be able to present 512 identifiable groups using only two brightness levels, or 19,683 identifiable groups when 3 brightness levels are used. It should be noted that the same number of identifiable groups will be presented over a smaller area as the number of brightness levels used is increased. This is due to the smaller number of emissive elements required. See for example that a MEGSOR capable of showing 4096 unique IDs requires 13 emitters when binary emissivity is used, but the same 4096 IDs requires only seven emitters when four levels of brightness are used.

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art. The spirit and scope of the appended claims should not be limited solely to the description of the preferred embodiments contained herein.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. § 112(f). In particular, the use of "steps of" in the claims herein is not intended to invoke the provisions of AIA 35 U.S.C. § 112(f).

What is claimed is:

1. An apparatus comprising:
a display comprising a plurality of emissive pixels, the display being an electronic device that generates light;
an observation device observing the light generated by a region of the display, the observation device being a non-biological electronic device;
display circuitry causing one or more emissive patterns to be displayed on the display; and
logic circuitry determining a position of the observation device relative to the display at least in part from the light observed by the observation device;
wherein the observation device is movable in relation to the display, or vice versa.

2. The apparatus of claim 1, wherein the region is smaller than a size of a pixel of the plurality of pixels.

3. The apparatus of claim 1, wherein the region encompasses more than one pixel of the plurality of pixels.

4. The apparatus of claim 1, wherein:
the display circuitry causes a single emissive pattern to be displayed on the display; and
the single emissive pattern emitted by the region is unique to the region so as to not be repeated anywhere else on the display.

5. The apparatus of claim 1, wherein the display circuitry causes a sequence of two or more emissive patterns to be displayed on the display.

6. The apparatus of claim 5, wherein the sequence of two or more emissive patterns emitted by the region is unique to the region so as to not be repeated anywhere else on the display.

7. The apparatus of claim 1, wherein the display or the observation device is supported by a thermal expansion fixture such that thermal expansion occurs around a predefined, invariant location in repeatable directions.

8. The apparatus of claim 1, wherein the display comprises an ultra-high definition television screen or an ultra-high definition computer monitor.

9. The apparatus of claim 1, wherein the display comprises a cellular telephone screen or a tablet computer screen.

10. The apparatus of claim 1, wherein each of the plurality of pixels is allowed to take on only two emissive states.

11. The apparatus of claim 1, wherein each of the plurality of pixels is allowed to take on greater than two emissive states.

12. The apparatus of claim 1, wherein each of the plurality of pixels includes a respective red, green, and blue sub-pixel.

13. The apparatus of claim 1, wherein:
the display circuitry causes a sequence of two or more emissive patterns to be displayed on the display; and
two or more emissive patterns in the sequence of two or more emissive patterns consist of a same pattern that is centered on different points on the display.

14. The apparatus of claim 1, wherein the observation device comprises a camera, a telescope, or a combination of portions of a camera and a telescope.

15. The apparatus of claim 1, wherein the display, the observation device, and at least a portion of the display circuitry and the logic circuitry are incorporated into a cellular telephone or a tablet computer.

16. The apparatus of claim 1, further comprising:
a second display comprising a plurality of second emissive pixels, the second display being a second electronic device that generates light; and
a second observation device observing the light generated by a second region of the second display;
wherein:
the display circuitry causes one or more second emissive patterns to be displayed on the second display;
the logic circuitry determines a position of the second observation device relative to the second display at least in part from the light observed by the second observation device; and
the second observation device is movable in relation to the second display, or vice versa.

17. The apparatus of claim 1, wherein:
the display comprises a plurality of rows of pixels;
the display causes a sequence of two or more emissive patterns to be displayed on the display; and
at least one row of the plurality of rows has a full-bright state in any given emissive pattern in the sequence of two or more emissive patterns.

18. The apparatus of claim 1, wherein:

the display comprises a plurality of columns of pixels;

the display causes a sequence of two or more emissive patterns to be displayed on the display; and at least one column of the plurality of columns maintains an unchanging emissive state throughout the sequence of two or more emissive patterns.

19. A method of determining a position of an object, the method comprising the steps of:

causing one or more emissive patterns to be displayed on a display that is an electronic device that generates light;

causing an observation device to observe the light generated by a region of the display, the observation device being a non-biological electronic device; and determining by logic circuitry a position of the observation device relative to the display at least in part from the light observed by the observation device;

wherein the observation device is movable in relation to the display, or vice versa.

20. The method of claim 19, wherein:

the region of the display is assigned a multiple-bit identification number;

the determining step comprises determining the multiple-bit identification number; and during the determining step, the multiple-bit identification number is determined from the display of only a single emissive pattern.

\* \* \* \* \*